(12) United States Patent
Simmons et al.

(10) Patent No.: US 10,975,540 B2
(45) Date of Patent: Apr. 13, 2021

(54) DEDEKIND CONE VALVE AND AIR INFILTRATION SYSTEM AND METHOD FOR HYDROELECTRIC PLANTS

(71) Applicant: Cube Hydro Partners, LLC, Bethesda, MD (US)

(72) Inventors: Walter Neal Simmons, Bahama, NC (US); Connor Tinen, Charlotte, NC (US)

(73) Assignee: Cube Hydro Partners, LLC, Bethesda, MD (US)

( * ) Notice: Subject to any disclaimer, the term of this patent is extended or adjusted under 35 U.S.C. 154(b) by 97 days.

(21) Appl. No.: 16/000,822

(22) Filed: Jun. 5, 2018

(65) Prior Publication Data
US 2019/0003139 A1    Jan. 3, 2019

Related U.S. Application Data
(60) Provisional application No. 62/528,143, filed on Jul. 2, 2017.

(51) Int. Cl.
*E02B 8/04* (2006.01)
*E02B 8/06* (2006.01)
*B01F 3/04* (2006.01)
*C02F 3/24* (2006.01)
*E02B 1/00* (2006.01)
*C02F 103/00* (2006.01)

(52) U.S. Cl.
CPC ............ *E02B 8/04* (2013.01); *B01F 3/04737* (2013.01); *C02F 3/24* (2013.01); *E02B 1/003* (2013.01); *C02F 2103/007* (2013.01); *C02F 2201/005* (2013.01); *C02F 2301/022* (2013.01); *E02B 8/06* (2013.01)

(58) Field of Classification Search
CPC ..... E02B 7/26; E02B 7/28; E02B 7/36; E02B 7/40; E02B 7/42; E02B 7/44; E02B 8/04; E02B 8/806; E02B 8/06
USPC ............................ 405/87, 99, 100, 103–105
See application file for complete search history.

(56) References Cited

U.S. PATENT DOCUMENTS 2,073,956 A * 3/1937 Becher ...................... E02B 7/44
                                                       405/101

OTHER PUBLICATIONS

Agathe Lesage, Wilson Dam & Hydroelectric Plant, Stoney Spillway Gate—1925, Wilson Dam Road (Rt. 133), Spanning the Tennessee River, Muscle Shoals, Colbert County, Alabama, Tennessee Valley Authority Recording Project, Historical American Engineering Record, National Park Service (1994).

(Continued)

*Primary Examiner* — Sunil Singh
(74) *Attorney, Agent, or Firm* — Watkins Law & Advocacy, PLLC

(57) ABSTRACT

An air infiltration system for a hydroelectric plant includes a spillway gate and a linearized cone valve coupled to the spillway gate, the linearized cone valve having a pivotable plate assembly. The spillway gate may be a tainter or Stoney gate and the pivotable plate assembly may have a deflection plate. A method of infiltrating air in water released from an impoundment may include: lifting a spillway gate from a resting position proximate a bottom of a spillway; and pivoting a deflection plate coupled to the gate proximate the bottom of the spillway; wherein water flows through an opening disposed between the deflection plate and the gate and is sprayed into an atmosphere to be oxygenated.

57 Claims, 23 Drawing Sheets

(56) References Cited

OTHER PUBLICATIONS

Richard Dedekind, Essays on the Theory of Numbers, authorized translation by Wooster Woodruff Beman, The Open Court Publishing Company, London (1901).
Cone Valves, Henry Pratt Company (2012).
Subchapter 2B—Surface Water and Wetland Standards, Sections .0100-.02300, Classifications and Water Quality Standards Applicable to Surface Waters and Wetlands of North Carolina (Dec. 20, 2016), downloaded from https://www.epa.gov/sites/production/files/2014-12/documents/nc-classifications-wqs.pdf.
Fixed Cone Valves, Howell-Bunger® and Ring Jet Valves, Rodny Hunt (undated).
John E. Bower et al., Structural Evaluation of Riveted Spillway Gates, Technical Report REMR-CS-43 (Jun. 1994), U.S. Army Corps of Engineers, Washington, DC.
Tony L. Wahl, Venting Hydroturbines for Dissolved Oxygen Enhancement, presented at 1995 Power O & M Workshop, Laughlin, Nevada, May 1-3, 1995, downloaded from https://www.usbr.gov/tsc/techreferences/hydraulics_lab/pubs/PAP/PAP-0684.pdf.
Gary E. Hauser and W. Gary Brock, Aerating Weirs for Management of Reservoir Releases (undated), downloaded from http://www.loginetics.com/pubs/AeratingWeirs_GEH_AWRA93.pdf.
Gary E. Hauser and Doug I. Morris, High-Performance Aerating Weirs for Dissolved Oxygen Improvement (undated), downloaded from http://www.loginetics.com/pubs/AeratingWeir_GEH_WP95.pdf.
Orbinox S.A., Model CH brochure (Apr. 2013), downloaded from http://www.cclynch.com/word/wp-content/uploads/2017/06/Orbinox-CH-Fixed-Cone-Valve.pdf.
Robert Carlsen, "Big Tujunga Dam," ENRCalifornia (Dec. 5, 2011), downloaded from https://www.enr.com/articles/10473-big-tujunga-dam.
Mark Mobley et al., Surface Water Pumps to Improve Dissolved Oxygen Content of Hydropower Releases (undated), downloaded from http://www.loginetics.com/pubs/SWPumps_MHM_WP95.pdf.
"Boosting Oxygen in the Water," Tennessee Valley Authority (undated), downloaded from https://www.tva.gov/Environment/Environmental-Stewardship/Water-Quality/Boosting-Oxygen-in-the-Water.
Paul Hopping et al., Update on Development of Auto-Venting Turbine Technology, Waterpower 1997, downloaded from http://www.loginetics.com/pubs/AVT_PNH_WP97.pdf.
Environmentally-Friendly Turbine Design, Voith Hydro Inc. (May 2011), downloaded from https://voith.com/corp-de/VH_Product_Brochure_Environmentally-friendly-turbine-design_14_vvk_t3360e_en.pdf.
Water Properties: Dissolved Oxygen, The USGS Water Science School (Jan. 20, 2017), downloaded from https://water.usgs.gov/edu/dissolvedoxygen.html.

* cited by examiner

DEDEKIND CONE VALVE AND AIR INFILTRATION SYSTEM AND METHOD FOR HYDROELECTRIC PLANTS

CROSS-REFERENCE TO RELATED APPLICATION

This application claims the benefits of U.S. Provisional Application No. 62/528,143 filed Jul. 2, 2017 by Walter Neal Simmons and entitled "Dedekind Cone Valve and Air Infiltration System and Method for Hydroelectric Plants" under 35 U.S.C. § 119(e) and the entire contents of that application are expressly incorporated herein by reference thereto.

FIELD OF THE INVENTION

The invention relates to an air infiltration system for hydroelectric plants and methods of use thereof. The invention further relates to linearized cone valves and their use in aeration. More specifically, the invention relates to a Dedekind cone valve.

BACKGROUND OF THE INVENTION

Hydroelectric power is an important source of renewable energy. According to the U.S. Energy Information Administration, in 2016, about 6.5% of the total utility-scale electricity generation in the United States was from hydropower, corresponding to 44% of the total utility-scale electricity generation from all renewable energy sources.

The general operation of a hydroelectric dam is straightforward. To generate electrical power, water from the impoundment (e.g., the reservoir) flows through an intake proximate the bottom of the dam (near the water floor), and is conducted through a penstock (e.g., a conduit or pipe) to the blades of a turbine (e.g., the runners or propeller). As the blades are quickly turned, so too is the turbine generator shaft. That shaft is coupled to the rotor of a generator that rotates with respect to the generator's stator to produce power. Finally, as water flows past the turbine blades, it is conducted through a tailrace (e.g., a channel) so as to be carried away from the dam.

Among its many upsides, hydropower doesn't pollute the air, it promotes "energy independence" by virtue of being domestically produced, and it contributes to the stability of the grid because its inherent storage capacity can be quickly tapped to respond to increases in electricity demand.

Despite offering many advantages, however, the use of dams has raised concerns because of their potential ecological influence, specifically their potential impact on water quality. Organic materials such as algal blooms and other organic debris can become concentrated in the water confined by a dam, especially due to limited circulation of that water. While some organic debris can be removed from the impoundment, it is not practical to remove it all. As bacteria decompose the materials, the microorganisms undesirably can consume a disproportionate share of the dissolved oxygen otherwise present in the water and critical to sustaining water-based life such as fish and aquatic insects. Complicating matters, a temperature differential commonly develops between water toward the surface and water toward the floor of the impoundment. The thermal stratification is known to create a warmer region or layer toward the surface (a.k.a. the epilimnion) and a comparatively colder region or layer toward the bottom (a.k.a. the hypolimnion). It is the hypolimnion that can become particularly oxygen-deprived, with the concentration of dissolved oxygen even potentially decreasing to a level as low as 1 milligram per liter (which is 1 part per million (ppm)).

The oxygen-poor hypolimnion can present challenges to hydropower operators, for example, if the desired dissolved oxygen concentration downstream of the hydroelectric plant is at least 6.0 milligrams per liter (6 ppm). For example, Title 15A (Environmental Quality) of the North Carolina Administrative Code (NCAC) assigns classifications and water quality standards to surface waters and wetlands in the state. "Class C" freshwaters are defined in 15A NCAC 02B.0101 (c)(1) as "freshwaters protected for secondary recreation, fishing, aquatic life including propagation and survival, and wildlife. All freshwaters shall be classified to protect these uses at a minimum." As for "fresh surface water standards for Class C waters," 15A NCAC 02B.0211(6) requires: "Dissolved oxygen: not less than 6.0 mg/l for trout waters; for non-trout waters, not less than a daily average of 5.0 mg/l with a minimum instantaneous value of not less than 4.0 mg/l; swamp waters, lake coves, or backwaters, and lake bottom waters may have lower values if caused by natural conditions."

Because the intake of a hydroelectric dam is typically disposed in the hypolimnion, water ultimately released through the tailrace can be less oxygenated (and colder) than desired. Operators of hydroelectric plants desire to proactively mitigate any potential impacts "below the dam," such as in the tailwater immediately downstream of the dam. Thus, there exists a need to address the issue of undesirably low dissolved oxygen concentrations in water discharged from dams.

A variety of technologies exist for aerating water at a hydroelectric dam. For example, a motorized blower or air compressor may be employed to actively introduce air into water in the turbine or draft tube. Such a design, however, suffers again from a loss of efficiency (which would vary as a function of the required motor horsepower but could be in the range of 1-5%) and shear cost including maintenance.

Another known active technology employs an oxygen tank and evaporators coupled to perforated hosing disposed in the hypolimnion (upstream of the turbine). The hosing delivers oxygen gas to the water through the perforations which release oxygen bubbles.

Yet another known active design for aerating the discharge water involves the injection of liquid oxygen. The shear ongoing expense, however, prevents this option from being adopted in mainstream applications. Additionally, there are significant safety concerns associated with storing, handling, and using liquid oxygen.

As another active option, pumps may be used to transport surface water from the epilimnion down to the dam's intakes to mix with water from the hypolimnion so that water with a higher average dissolved oxygen concentration enters the turbine for subsequent discharge from the dam. Such pumps must be powerful enough to transport a substantial amount of water and the capital costs for installation are quite significant.

In contrast to the aforementioned active design modifications, numerous passive technologies are known. For example, so-called auto-venting turbine technology draws atmospheric air into the operating turbine to aerate the discharge water flow. In one design known as distributed aeration, air is drawn through pipes disposed above the turbine's head cover and flows into the water through slots on the discharge edges of hollow runner blades. In another design known as central aeration, air is drawn from above the turbine's head cover either through the hollow interior of the turbine shaft or around the sides of the turbine's deflector before being introduced into the water. In yet another design known as peripheral aeration, air is drawn through a manifold system proximate the draft tube (which is disposed at the exit of the turbine and is connected to the tailrace) and is introduced into the water through a slot or orifices on the inside surface of the cone portion of the draft tube. While certainly increasing dissolved oxygen levels, such auto-venting designs unfortunately suffer from several disadvantages including a loss of operating efficiency (for example, by 2-4%) and increased costs because they are not standard features of hydroelectric turbines.

Another option for aerating water employs the turbine's vacuum breaker system, which draws air proximate the turbine runners when a vacuum is induced. For example, baffles may be added to vacuum breaker air discharge ports in either the turbine runner's crown or nose cone and the vacuum breaker may be locked in an open state to allow air to continue to flow. Alternatively, a bypass conduit may be added to the vacuum breaker to add ventilation to the head cover. Again, however, these designs unfortunately suffer from several disadvantages including a loss of operating efficiency (for example, by 2%) and increased costs because they are not standard features of certain hydroelectric turbines.

Another passive means, an aerating weir, is used to reaerate turbine discharges that are oxygen poor. The weir essentially acts as a waterfall; water is oxygenated as it falls over the edge of the weir. Such weirs are downstream of the turbine. Unfortunately, weirs suffer from cost and safety issues. As to the latter, they present obstacles to users of the waterway.

Finally, fixed cone valves (also known as Howell-Bunger valves, free discharge valves, or ring jet valves) may be installed in dams as a means of aerating water discharged from impoundments. Because of the discharge profile of water released from such valves, in the form of an expanding conical jet, a substantial flow surface contacts surrounding atmosphere at variable but controllable rates, interacting with and entraining air to thereby oxygenate the water. In effect, an aerated spray is created, exiting the valve commonly at either 45 degrees (e.g., if a cone with a 90-degree cone angle is used) or 30 degrees as measured with respect to an axis extending perpendicular from the pipe. The body of the valve typically comprises a central, conical deflector head proximate the downstream end, internal radial ribs, and a mounting flange proximate the upstream end. A valve gate is provided in the form of a cylinder that slides over the valve body, and the valve typically is operated using a mechanical screw stem actuating system or hydraulic cylinders. The gate is a telescoping sleeve that regulates water flow. In the valve, water flows around the central cone and is discharged at high pressure.

Despite their dependable performance, retrofitting of fixed cone valves in existing dams can be especially difficult and carries the risk of potentially damaging the structure of the dam itself. In particular, a pipe must be installed through the dam to connect the impoundment to the valve on the free air side of the dam. Such pipes tend to be large and can easily be 36 inches in diameter, although the pipes coupled to the fixed cone valves can have diameters considerably larger in size. For example, the Big Tujunga Dam located in northern Los Angeles County was retrofitted with fixed cone valves having diameters of 42 inches, 56 inches, and 66 inches; yet even those sizes are modest compared to other installations. Boring through the structure of the dam can be fraught with risk. Moreover, providing the necessary structural support for the valve, and access for maintenance purposes, are not trivial considerations. Still further, the diameter of the valve limits the flow rate of water exiting the valve and thus the aeration of that water, such that it may be necessary to install more than one valve (and pipe from the impoundment) in order to meet aeration demands.

Thus, despite the aforementioned known technologies for aerating water released from an impoundment, there exists a need for other aeration solutions that carry less risk and are more cost-effective.

SUMMARY OF THE INVENTION

An air infiltration system for a hydroelectric plant includes a spillway gate and a linearized cone valve coupled to the spillway gate, the linearized cone valve having a pivotable plate assembly. In one embodiment, the spillway gate may be a tainter gate. In another embodiment, the spillway gate may be a Stoney gate. The pivotable plate assembly may have a deflection plate. The deflection plate may extend substantially the length of the spillway gate proximate an end thereof disposed toward a bottom of a spillway.

The pivotable plate assembly may maintain a substantially constant opening over a fixed gap range between the spillway gate and a spillway surface. Over a fixed range of pivoting, the linearized cone valve may permit a substantially constant rate of flow therethrough.

The linearized cone valve may be formed with a plurality of sections, each section having at least one deflection plate coupled to at least one clevis plate, and the at least one clevis plate being pivotable about a pin. The pin may be configured and dimensioned to break away upon application of a force of at least a pre-set magnitude.

In some embodiments, the linearized cone valve may be bolted to at least one rib of the spillway gate. In other embodiments, the spillway gate includes a bottom plate, and the linearized cone valve is welded to the bottom plate. The linearized cone valve instead may be welded to the spillway gate elsewhere thereon, for example, welded to at least one rib of the spillway gate.

In addition, a method of infiltrating air in water released from an impoundment may include: lifting a spillway gate from a resting position proximate a bottom of a spillway; and pivoting a deflection plate coupled to the gate proximate the bottom of the spillway; wherein water flows through an opening disposed between the deflection plate and the gate and is sprayed into an atmosphere to be oxygenated.

When the water is sprayed, water droplets may be formed with a generally spherical shape and at least 75% of the water droplets have a diameter no greater than 1 cm, at least 50% of the water droplets have a diameter no greater than 1 mm, or at least 25% of the water droplets have a diameter no greater than 0.1 mm.

A ratio of total surface area of water droplets after being expelled from the opening to total surface area otherwise created by laminar flow entering the opening may be at least 10, at least 25, at least 50, or at least 75.

At least a 1000% increase in surface area of water exposed to the atmosphere may be created when the water is sprayed. At least a 2500% increase in surface area of water exposed to the atmosphere may be created when the water is sprayed. At least a 5000% increase in surface area of water exposed to the atmosphere may be created when the water is sprayed. At least a 7500% increase in surface area of water exposed to the atmosphere may be created when the water is sprayed.

A ratio of (a) surface energy creation when water flows through the opening disposed between the deflection plate and the gate to (b) surface energy creation for laminar flow of water under the gate if the deflection plate is not present may be at least 10, at least 25, at least 50, or at least 75.

At least a 1000% increase in surface energy may be created by water flowing (a) through the opening disposed between the deflection plate and the gate as compared to (b) laminar flow of water under the gate if the deflection plate is not present. At least a 2500% increase in surface energy may be created by water flowing (a) through the opening disposed between the deflection plate and the gate as compared to (b) laminar flow of water under the gate if the deflection plate is not present. At least a 5000% increase in surface energy may be created by water flowing (a) through the opening disposed between the deflection plate and the gate as compared to (b) laminar flow of water under the gate if the deflection plate is not present. At least a 7500% increase in surface energy may be created by water flowing (a) through the opening disposed between the deflection plate and the gate as compared to (b) laminar flow of water under the gate if the deflection plate is not present.

In some embodiments, the deflection plate may break away upon application of a force of at least a pre-set magnitude.

A ratio of (1) surface area of water exposed to atmosphere after flowing through the opening disposed between the deflection plate and the gate to (2) volume of water entering the opening may be at least 300, at least 3000, or at least 30,000.

In some embodiments, over a fixed range of gap between the spillway gate and the bottom of the spillway, a constant amount of water flows through the opening disposed between the deflection plate and the gate or mounting assembly of the valve (e.g., support/channel). The fixed range may be 1.1 inches to 2 inches, or the fixed range may be 1.5 inches to 2 inches. A difference between a maximum gap in the fixed range and a minimum gap in the fixed range may be at least 0.01% of a height of the spillway gate, at least 0.1% of a height of the spillway gate, at least 1% of a height of the spillway gate, or at least 10% of a height of the spillway gate. In an exemplary embodiment, a height of the spillway gate may be 36 feet (432 inches), e.g., the overall height of the gate from top to bottom thereof.

In some embodiments, the fixed range may have a minimum gap and a maximum gap, with the minimum gap being 0.1 inch and the maximum gap being at least 0.5 inch. Over a fixed range of gap between the spillway gate and the bottom of the spillway, the deflection plate may remain in contact with the bottom of the spillway. The fixed range may be 0 inch to 2 inches. The fixed range may have a minimum gap and a maximum gap, with the minimum gap being 0 inch and the maximum gap being at least 0.1 inches.

In some embodiments, if a gap between the spillway gate and the bottom of the spillway exceeds a fixed size, then at least 90% of water released from the impoundment flows between the deflection plate and the bottom of the spillway. The fixed size may be no greater than 24 inches, no greater than 12 inches, or no greater than 1 inch. At least 95% of water released from the impoundment may flow between the deflection plate and the bottom of the spillway. At least 99% of water released from the impoundment flows between the deflection plate and the bottom of the spillway.

When the water is sprayed, the water may form droplets, and surfaces of the droplets may gain increased oxygen content from the atmosphere.

In some embodiments, a confluence may form from the water sprayed into the atmosphere and less-oxygenated water downstream from the impoundment, with the confluence having dissolved oxygen concentration of at least 6.0 mg/l. In other embodiments, a confluence may form from the water sprayed into the atmosphere and less-oxygenated water downstream from the impoundment, the confluence having dissolved oxygen concentration with a daily average of at least 5.0 mg/l with a minimum instantaneous value of at least 4.0 mg/l. A confluence may form from the water sprayed into the atmosphere and less-oxygenated water downstream from the impoundment, with the confluence increasing dissolved oxygen concentration in water downstream from the impoundment.

BRIEF DESCRIPTION OF THE DRAWINGS

Preferred features of the inventions are disclosed in the accompanying drawings, wherein.

DETAILED DESCRIPTION OF THE PREFERRED EMBODIMENTS

Figure 1:
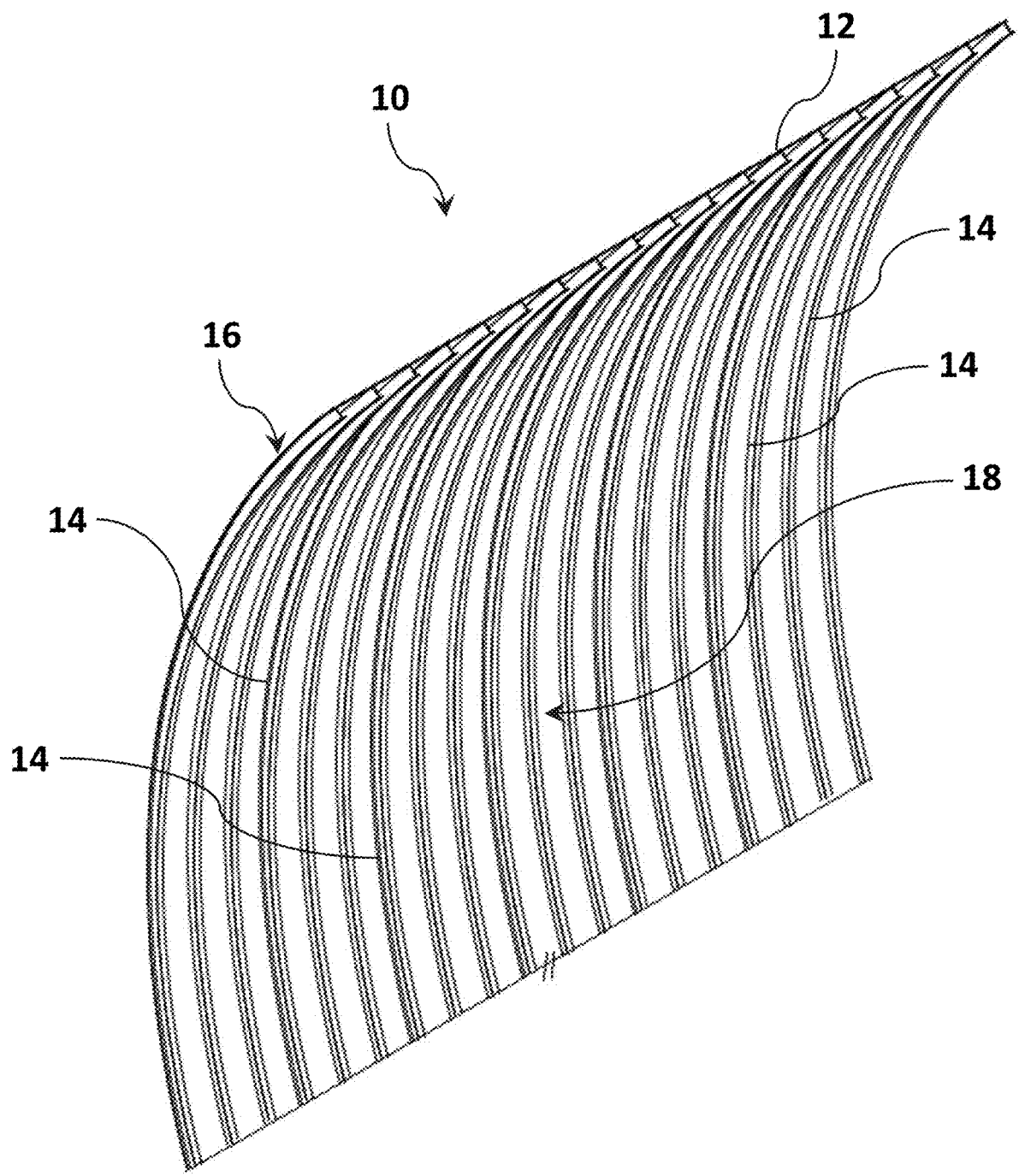
FIG. 1 is a partial side perspective view of a tainter gate of the prior art.
Figure 2:
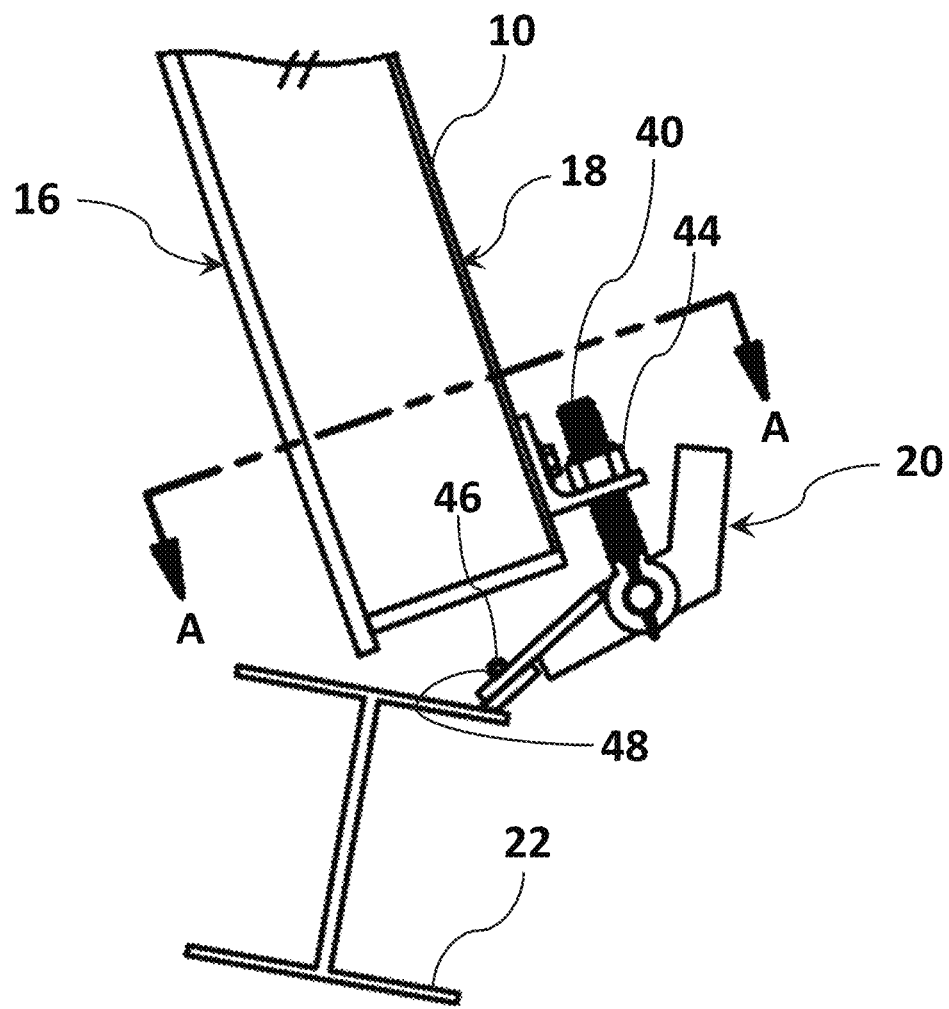
FIG. 2 is a partial cross-sectional side view of a tainter gate with a first embodiment of a linearized cone valve.
Figure 3:
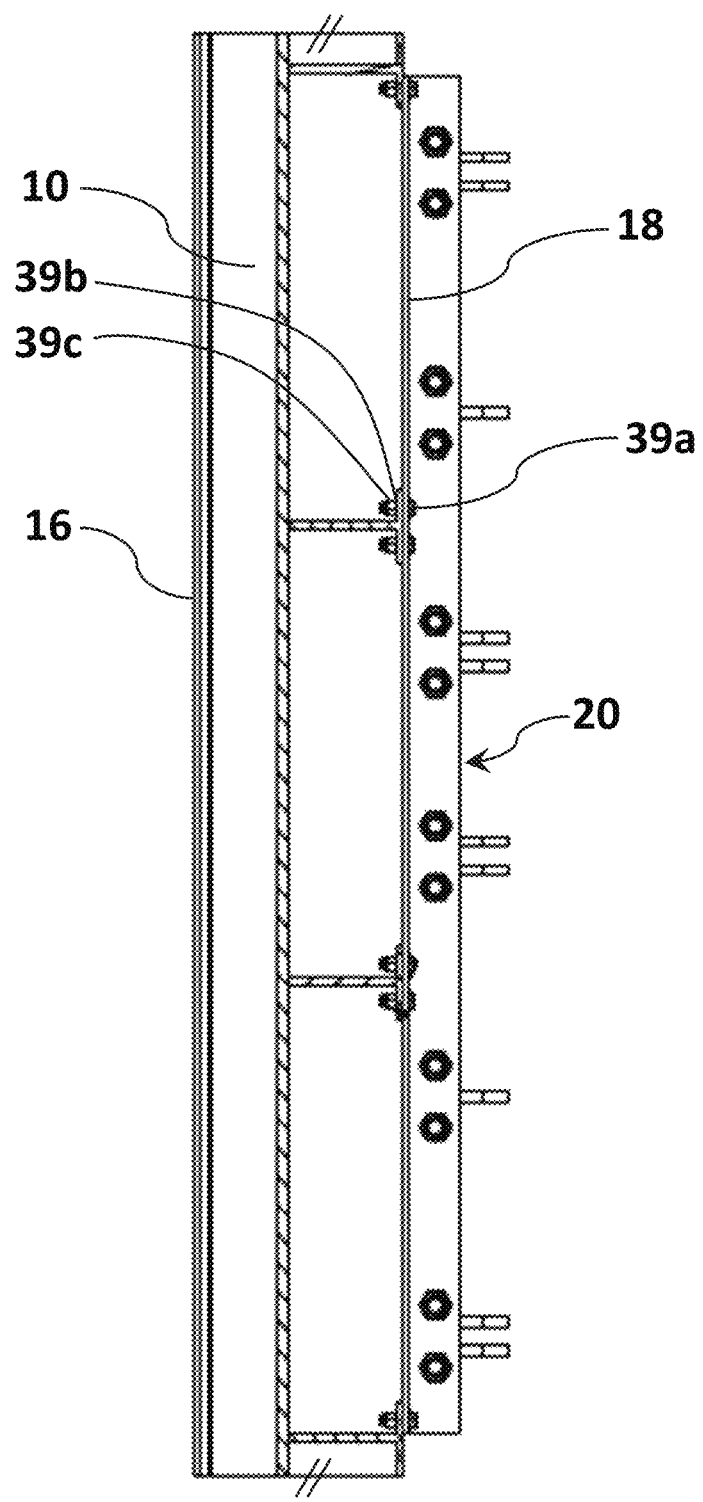
FIG. 3 is a partial cross-sectional view of the tainter gate and valve through line A-A in FIG. 2.
Figure 4:
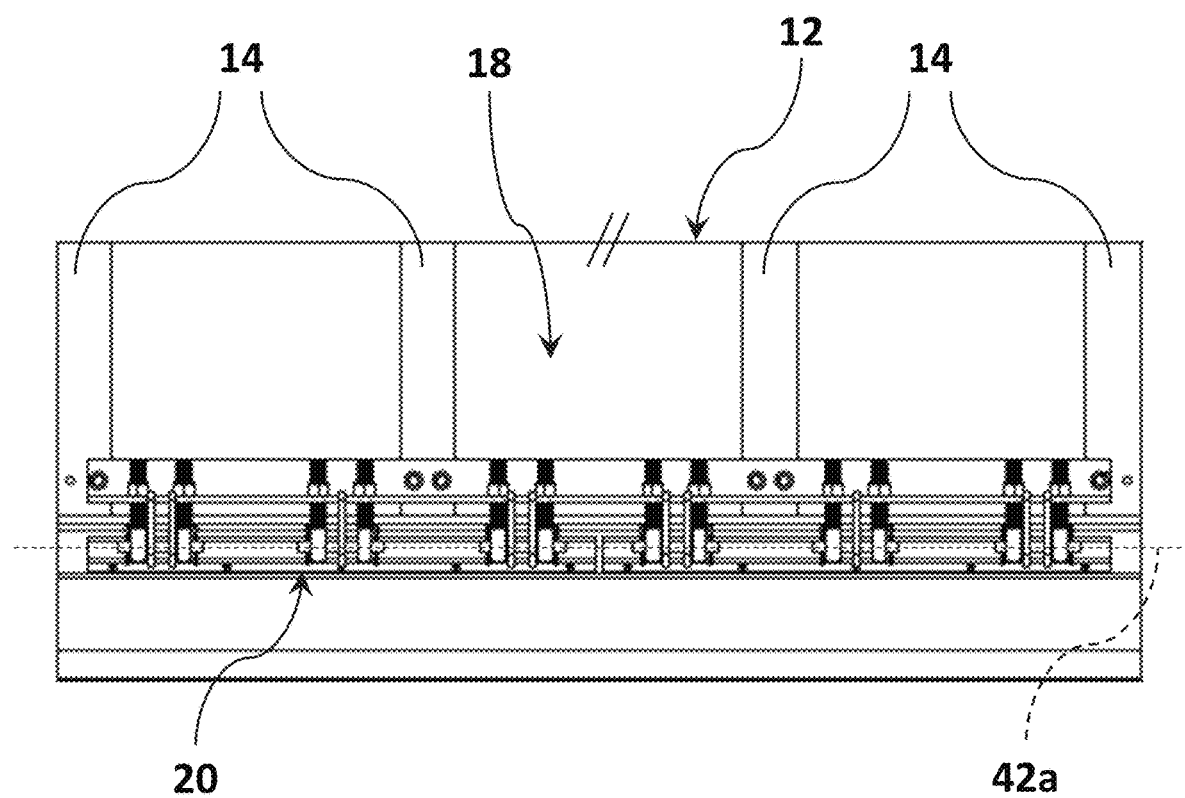
FIG. 4 is a partial front view (e.g., from a perspective from downstream of a gate looking upstream) of the tainter gate and valve of FIG. 2.
Figure 5:
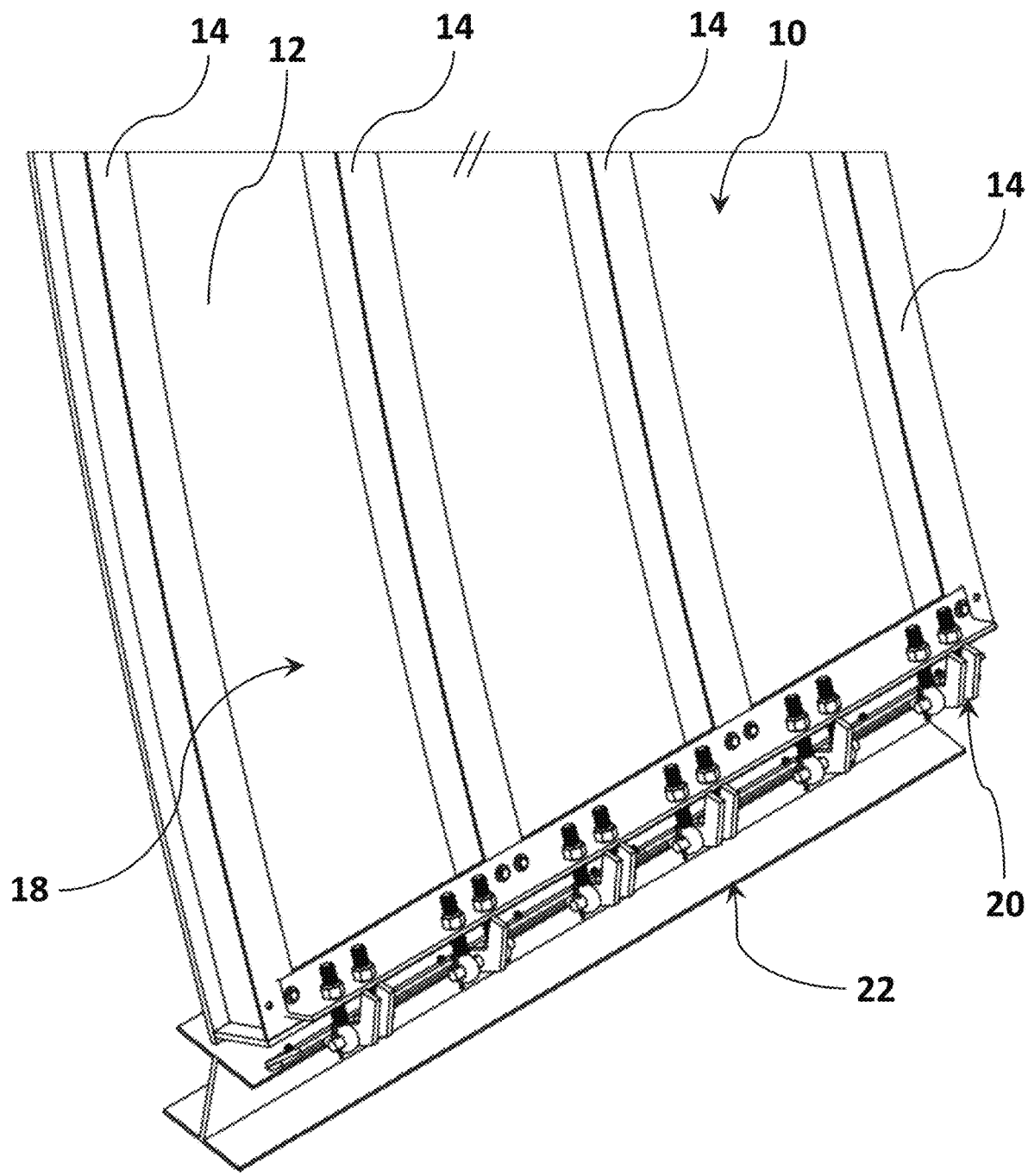
FIG. 5 is a partial front perspective view of the tainter gate and valve of FIG. 2.

In order to improve the amount of dissolved oxygen in water released downstream of a dam, the water is aerated using valves retrofitted to an existing dam structure. By adding such valves, it is possible to break-up water flowing from the impoundment into a spray of water droplets whose collective surface area is much greater than the surface area of the water not in droplet form and that would be exposed in continuous flow. In particular, the water droplets preferably are spherical and sized no greater than 1 cm in diameter, more preferably no greater than 1 mm in diameter, and even more preferably no greater than 0.1 mm in diameter. Preferably, each droplet is exposed to atmospheric air upon discharge from a valve, such that the water proximate the surface of the droplet becomes saturated (for example, a function of temperature and pressure) with oxygen before being recombined into the body of water flowing downstream of the dam. The combination of (1) oxygen-saturated water with (2) low oxygenated water already present downstream of the dam improves the oxygen level of water downstream of the dam. This effect can be utilized to achieve a desired level of dissolved oxygen, e.g., not less than 6.0 mg/l. In short, the greater the number and smaller the size of droplets, the greater the surface area that can be exposed to atmosphere and thus that will become saturated with oxygen.

Advantageously, a flow of water from the impoundment for aeration, as discussed above, may be adjusted to achieve a desired level of dissolved oxygen downstream of the dam while only releasing the necessary volume of water from the impoundment to do so. In other words, the flow of water passing through the valves as disclosed herein may be modulated. Because water passing through the valves, in the exemplary embodiments, is not passed through a turbine to generate electrical power, the release of that water generally should be minimized to the extent possible because the primary purpose of the dam, of course, is to retain water, such as for agriculture, flood control, drinking water, or hydropower.

In practice, use of the valves allows complete or near-complete saturation (e.g., 85-100%) of the water passing therethrough so that the oxygen levels can be increased in the reservoir below to acceptable levels. The flow of water to be saturated is a function of the valve opening (which is controlled by the width of the gap between the deflector plate and the mounting angle, as will be discussed), the size of the gate, the size of the reservoir, and the gate opening itself. Acceptable saturation levels may be set, for example, by state law and environmental requirements.

As one measure of the effectiveness of the valve, one can determine the ratio of (1) the surface area of water exposed to atmosphere after passage through the valve to (2) the surface area of water exposed to atmosphere in normal flow out of the gate. The surface area of water exposed to atmosphere after passage through the valve is approximated as the volume of water passing through the gate divided by the average volume of the droplets created upon expulsion from the valve, all multiplied by the surface area of a droplet. This approximates the total surface area of water exposed to atmosphere by the valve as the valve causes the streamflow to be broken into droplets. This is compared to the surface area of water exposed to atmosphere in normal laminar flow out of the gate. In this case, laminar flow conditions are assumed rather than actual. Surface area exposed to atmosphere in laminar flow may be approximated as the volume of water passing through the gate divided by the height of the gate opening. Combined, this ratio may be approximated as three times the height of the gate opening or valve opening (whichever is less), all divided by the average radius of the water droplets created by passage through the valve.

As another measure of the effectiveness of droplet creation, one can use the ratio of total surface area of water droplets after being expelled from a valve to total surface area that would be created by laminar flow entering the valve.

Using either measure, preferably, the ratio is at least 10, more preferably at least 25, even more preferably 50, and most preferably at least 75.

Preferably, at least a 1000% increase in surface area of water exposed to the atmosphere is created by the valve, more preferably at least a 2500% increase, even more preferably at least a 5000% increase, and most preferably at least a 7500% increase in surface area of water exposed to the atmosphere is created by the valve.

With respect to surface energy of a comparable, hypothetical laminar flow of water passing under the gate, the rate of surface energy creation, with and without the valve, also can be estimated using the above-identified ratios. Thus, using either measure, preferably, the ratio is at least 10, more preferably at least 25, even more preferably 50, and most preferably at least 75. Preferably, at least a 1000% increase in surface energy is created by the flow of water through the valve as compared to a hypothetical, laminar flow beneath the gate (i.e., without any valve), more preferably at least a 2500% increase, even more preferably at least a 5000% increase, and most preferably at least a 7500% increase in surface energy is created by the flow of water through the valve as compared to a hypothetical, laminar flow beneath the gate.

Spillway gates are used to dam or release water flow in a controlled fashion. These hydraulic structures typically may be tainter gates, vertical lift gates (such as fixed-wheel gates, tractor gates, and Stoney gates), or roller gates. As shown in FIG. 1, an exemplary tainter gate 10, for example, comprises a curved (e.g., cylindrical shell segment) skin plate 12 stiffened by curved vertical ribs 14 (which instead, for example, may be beams, braces, ties, or other protruding members). In some embodiments, horizontal stiffening ribs (not shown) may additionally be used. The upstream surface 16 of the plate is submerged and exposed to the impoundment, while the downstream surface 18 is exposed to the atmosphere. Rib members 14 are disposed on downstream side 18. Tainter gates 10 typically are formed from structural steel. Such gates typically are operated with chain, drum, or wire rope hoists or hydraulic cylinders (not shown). As is known in the art, a truss structure may form radial arms that couple plate 12 to a trunnion or other pinned joint so that flow of water below the gate may be regulated by rotation of the gate about the trunnion or other joint. Tainter gates are known to be safe inasmuch as their substantial weight in steel makes their closed state the default; in other words, gravity forces the gates to the closed position even with the hydrostatic pressure of the impoundment on the gate. They are relatively easy to lift or lower vertically.

The inventions disclosed herein relate to Dedekind cone valves. As the mathematician Richard Dedekind (1831-1916) explained: "Whenever, then, we have to do with a cut $(A_1, A_2)$ produced by no rational number, we create a new, an irrational number, which we regard as completely defined by this cut $(A_1, A_2)$; we shall say that the number corresponds to this cut, or that it produces this cut. From now on, therefore, to every definite cut there corresponds a definite rational or irrational number, and we regard two numbers as different or unequal always and only when they correspond to essentially different cuts." See Richard Dedekind, *Essays on the Theory of Numbers*, authorized translation by Wooster Woodruff Beman, The Open Court Publishing Company, London, 1901, at 7. Dedekind cuts are understood, in a geometric sense, to involve the intersection of lines that cross one another. Thus, by taking a "cut" through a traditional cone valve, a section thereof forms the linearized cone valve as described herein.

The inventions disclosed herein adapt spillway gates, such as tainter gate 10, to provide aeration to water released from the impoundment. In particular, as shown in FIGS. 2-6, linearized cone or aeration valves 20 are coupled proximate a bottom portion of tainter gate 10 to permit controlled release of water from the impoundment. As shown and will be further discussed, portions of valves 20 abut the bottom of a spillway which tainter gate 10 abuts when in the fully closed position. In an exemplary embodiment, the abutment comprises a steel sill beam 22 embedded in a concrete spillway. Linearized cone valves 20 are formed by taking a traditional fixed cone valve and extracting a Dedekind cut to form each linearized cone valve.

Figure 6:
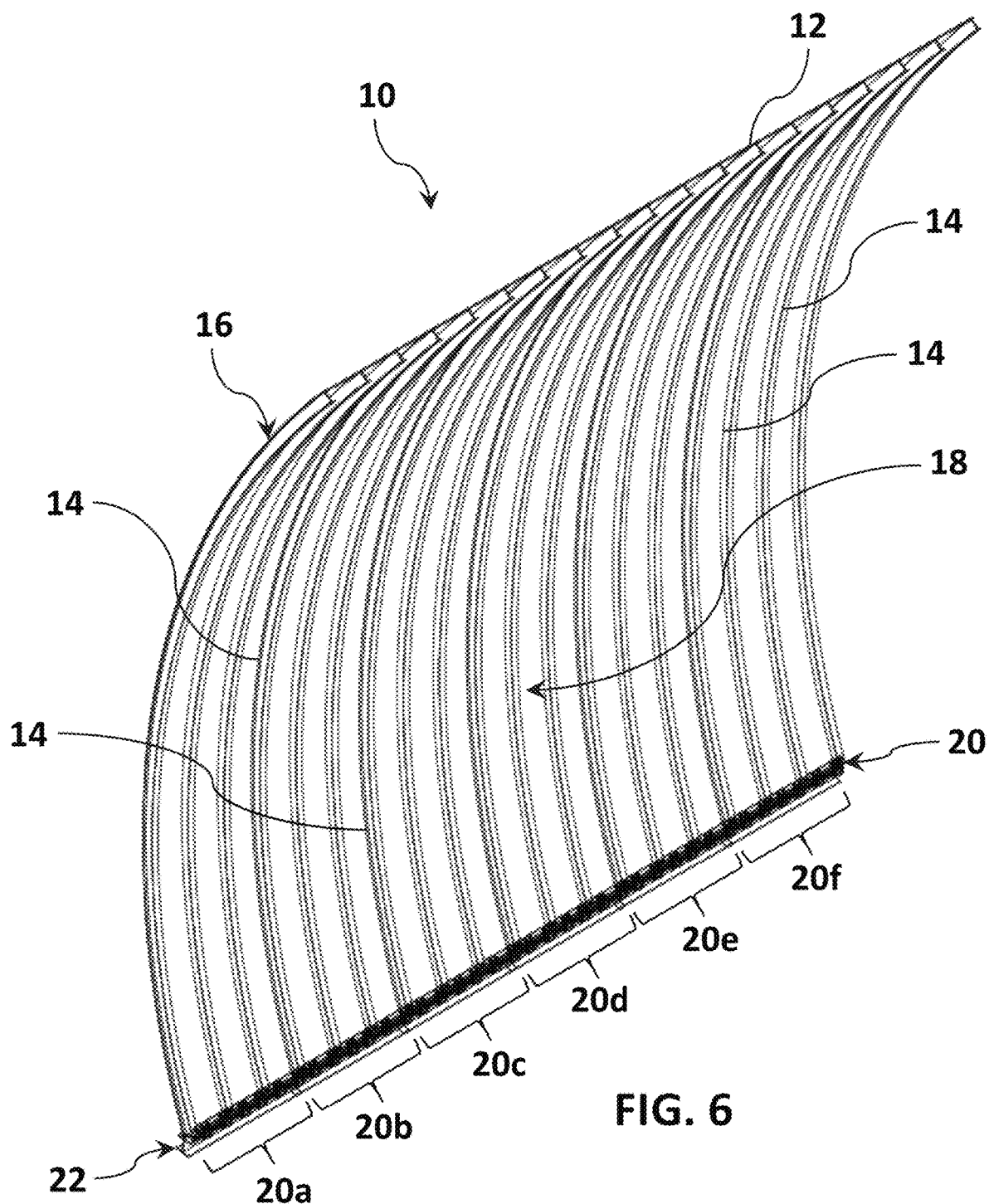
FIG. 6 is another front perspective view of the tainter gate and valve of FIG. 2.
Figure 7:
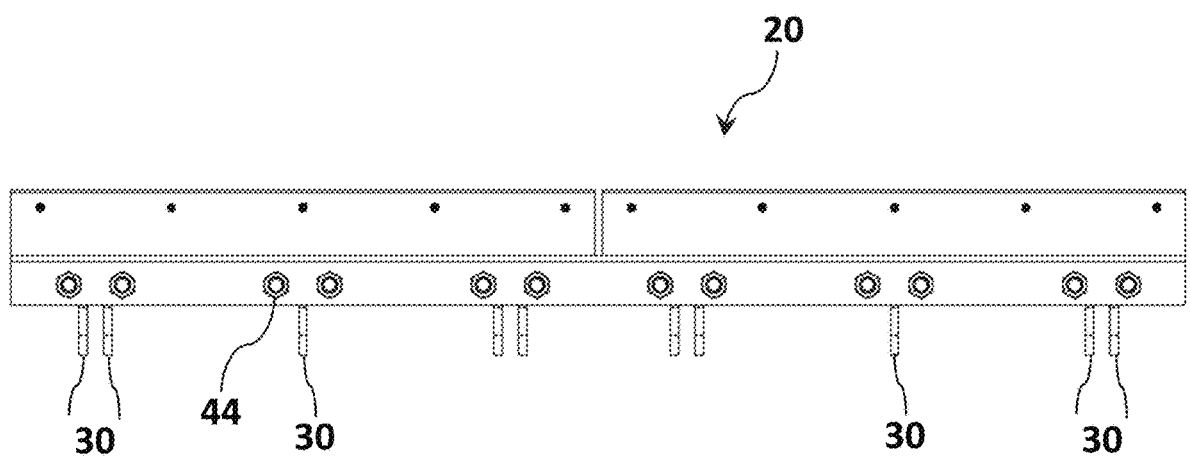
FIG. 7 is a partial top view of the linearized cone valve of FIG. 2.
Figure 8:
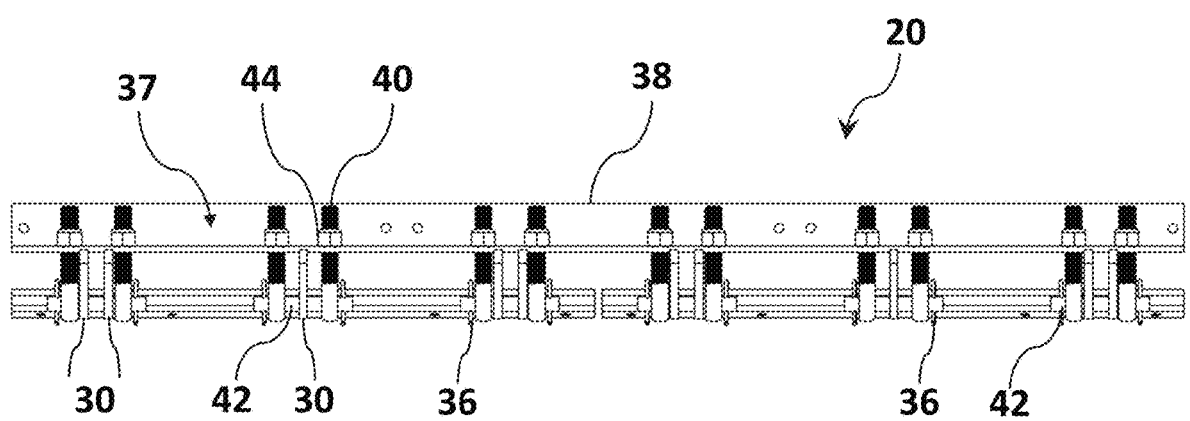
FIG. 8 is a front view of the linearized cone valve of FIG. 2.

As shown for example in FIG. 6, valves 20 are provided proximate the base of tainter gate 10 in modular fashion. In particular, as shown in the exemplary embodiment, six sections of valves 20a, 20b, 20c, 20d, 20e, and 20f are provided. Each valve 20 preferably comprises at least one clevis plate 30 pivoting about a pivot pin 42, as will be described next.

Turning to FIGS. 7-20, valve 20 comprises clevis plates 30, deflection plates 32, bumpers 34, cotter pins 36 (e.g., each ¼" diameter and 2" long) extending through parallel through-holes in pins 42, and a mounting assembly 37 comprising mounting angles 38, fully threaded rod ends 40 (e.g., rod end bolts each with a one inch-8 thread and a six inch shank), rod-end nuts 44 (e.g., nylon-insert locknuts for 1"-8 thread) for coupling to rod ends 40, as well as bolts 39a (e.g., hex head screws with ½"-13 thread and 1½" length), washers 39b (e.g., 1¼" O.D. flat washers for ½" thread sizes), and nuts 39c (e.g., nylon-insert locknuts for ½"-13 thread) for securing angle 38 directly to the gate such as to ribs 14 (which may vary in size, shape, and/or orientation and for example may be rectangular or hexagonal in shape). Valve 20 further comprises bumper screws 46 (e.g., hex drive flat head screws with ¼"-20 thread and 1⅛" length), and bumper nuts 48 (e.g., nylon-insert locknuts for ¼"-20 thread). Each of the aforementioned components preferably is formed of stainless steel, except bumper 34 which preferably is made of ultra-high molecular weight (UHMW) polyethylene. In a preferred exemplary embodiment, mounting angle 38, rod ends 40, and pins 42 are formed of 304 stainless steel, while clevis plate 30 and deflection plate 32 are formed of 304L stainless steel, cotter pins 36 are formed of 316 stainless steel, and rod end nuts 44, bumper screws 46, bumper nuts 48, and assembly bolts 39a, washers 39b, and nuts 39c are formed of 18-8 stainless steel. Preferably, clevis plates 30 are welded to respective deflection plates 32.

Figure 21:
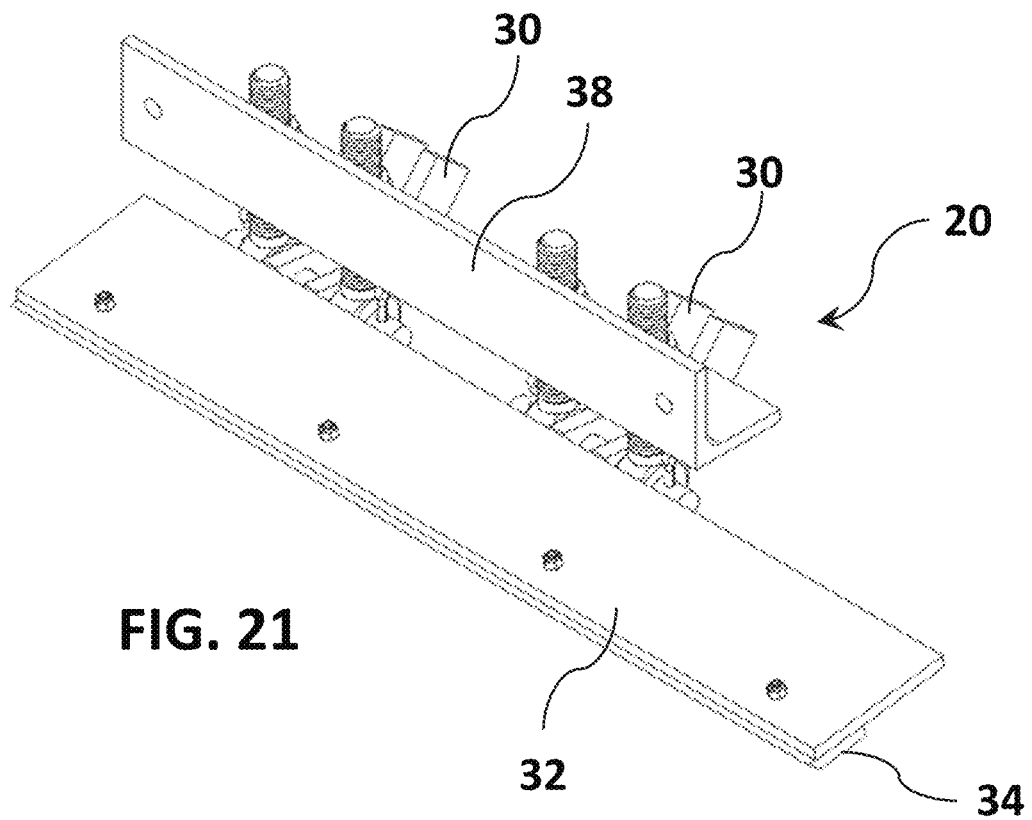
FIG. 21 is a rear perspective view of another embodiment of a linearized cone valve.
Figure 22:
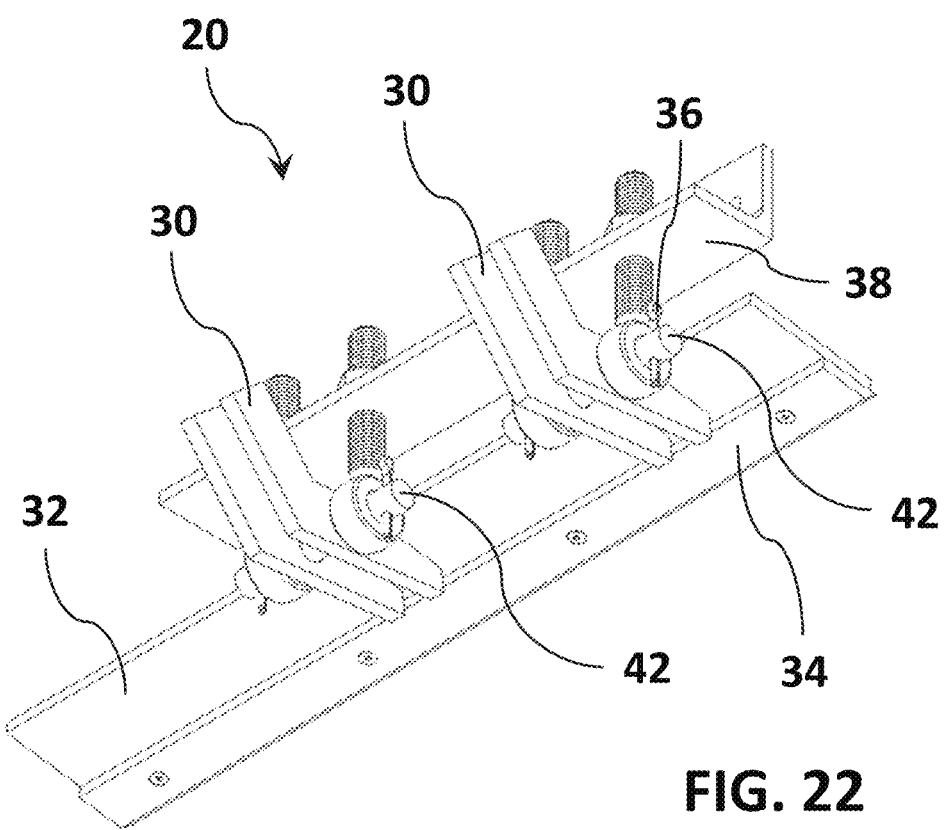
FIG. 22 is a front perspective view of the linearized cone valve of FIG. 21.

As shown in FIGS. 21-22, in some embodiments, mounting angle 38 may have a length shorter than defection plate 32. Also, comparing valves 20 shown in FIGS. 7-9 with valve 20 in FIGS. 21-22, deflection plates 32 and bumpers 34 may have different lengths as needed. Such a design permits installation, for example, in free end sections of a tainter gate where clearance is needed for other structures or components of the gate.

Figure 10:
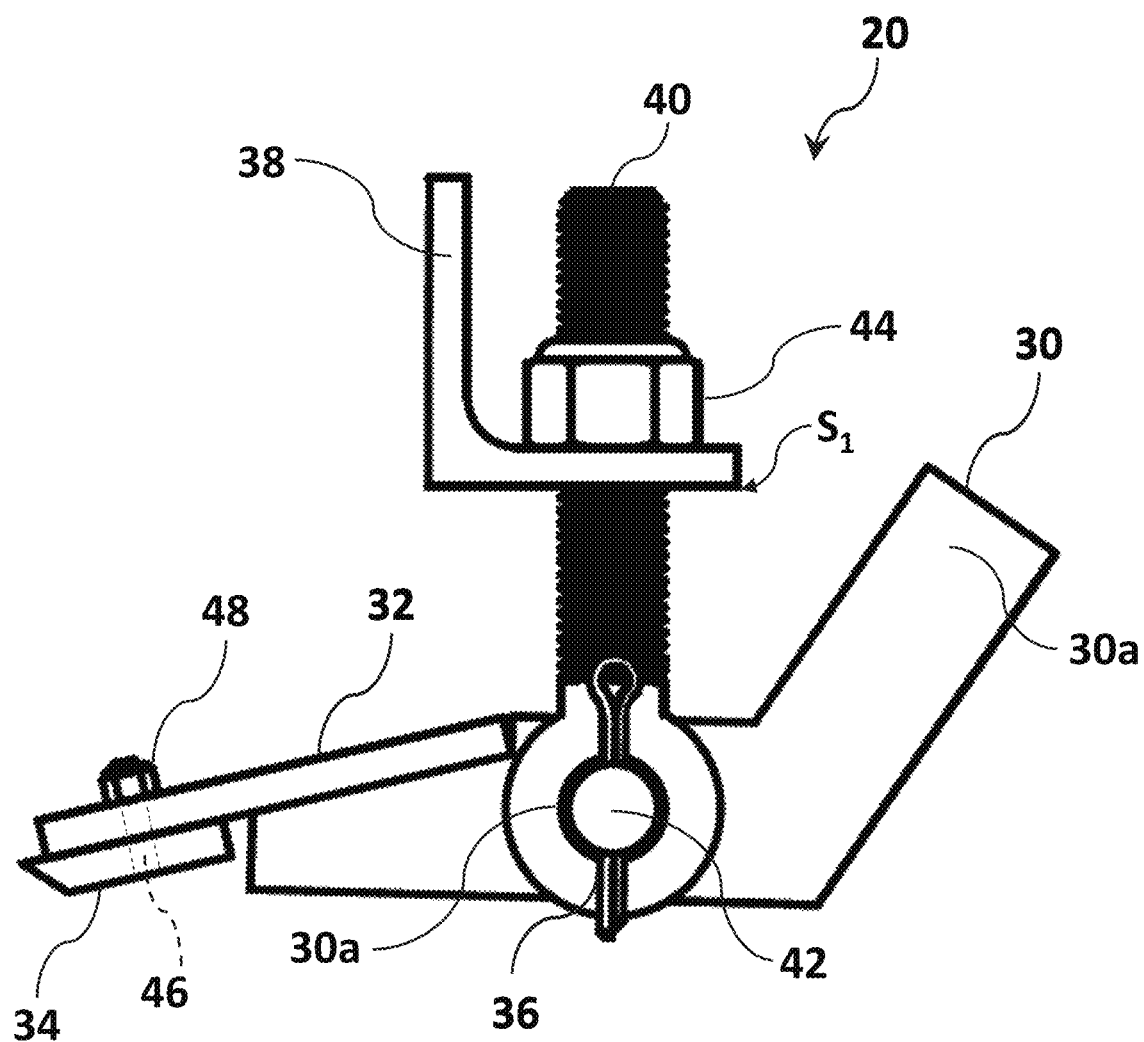
FIG. 10 is a partial side view of the linearized cone valve of FIG. 2.
Figure 11:
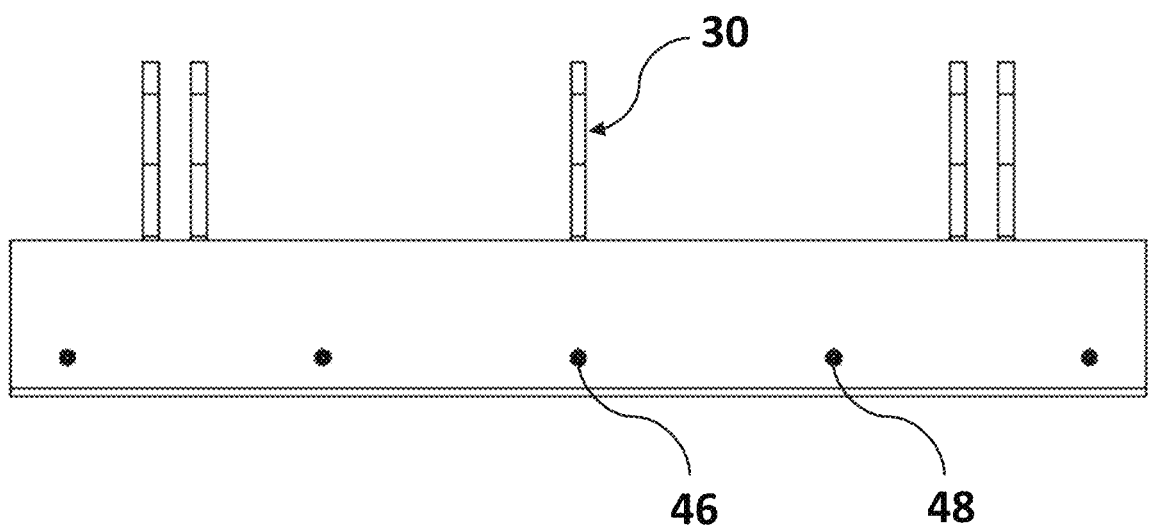
FIG. 11 is a partial top view of the deflection plate assembly of the linearized cone valve of FIG. 2.
Figure 12:
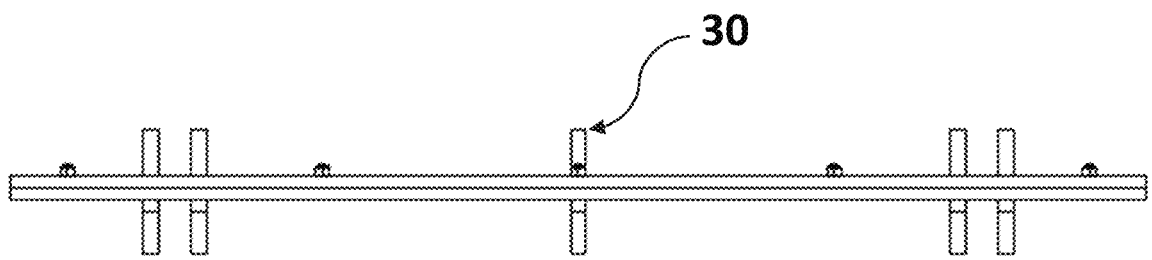
FIG. 12 is a partial front view (e.g., from a perspective from upstream of a gate looking downstream) of the plate assembly of the linearized cone valve of FIG. 2.
Figure 13:
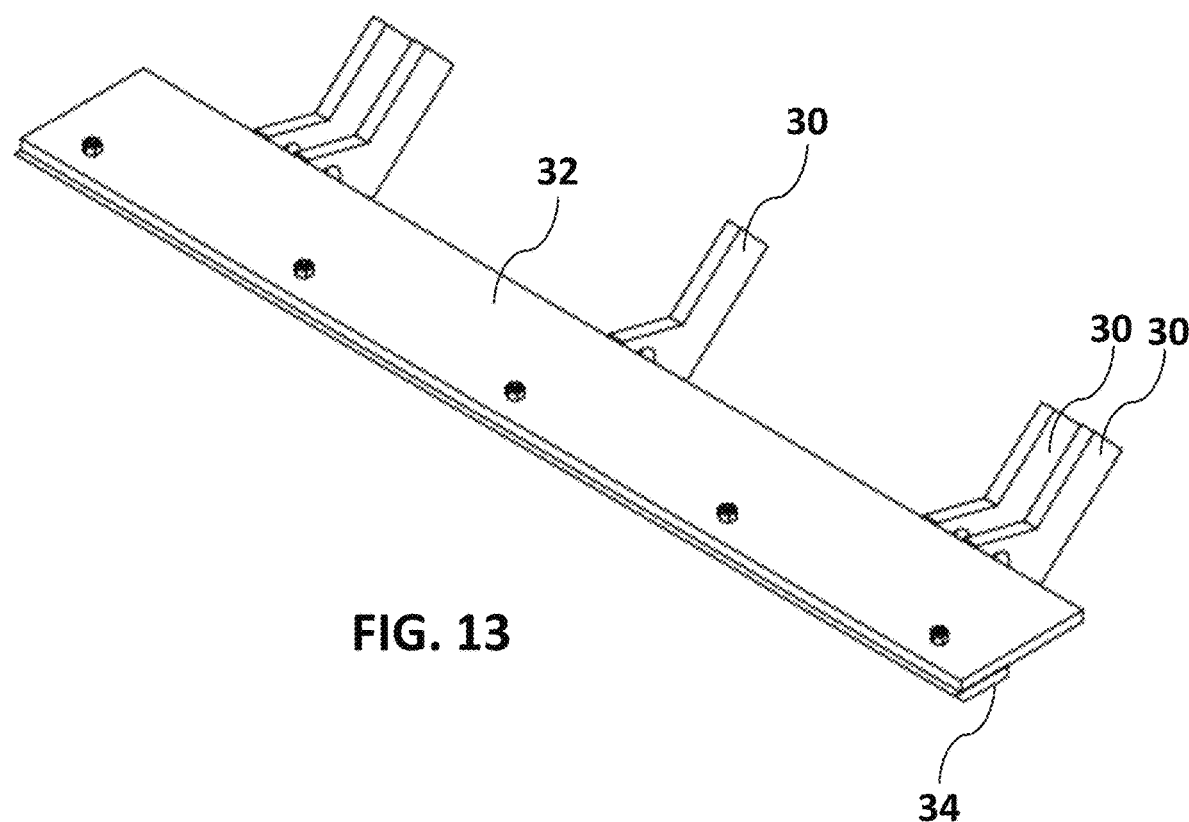
FIG. 13 is a partial rear perspective view of the plate assembly of the linearized cone valve of FIG. 2.
Figure 14:
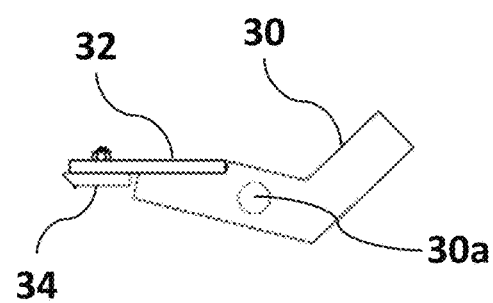
FIG. 14 is a partial side view of the plate assembly of the linearized cone valve of FIG. 2.
Figure 15:
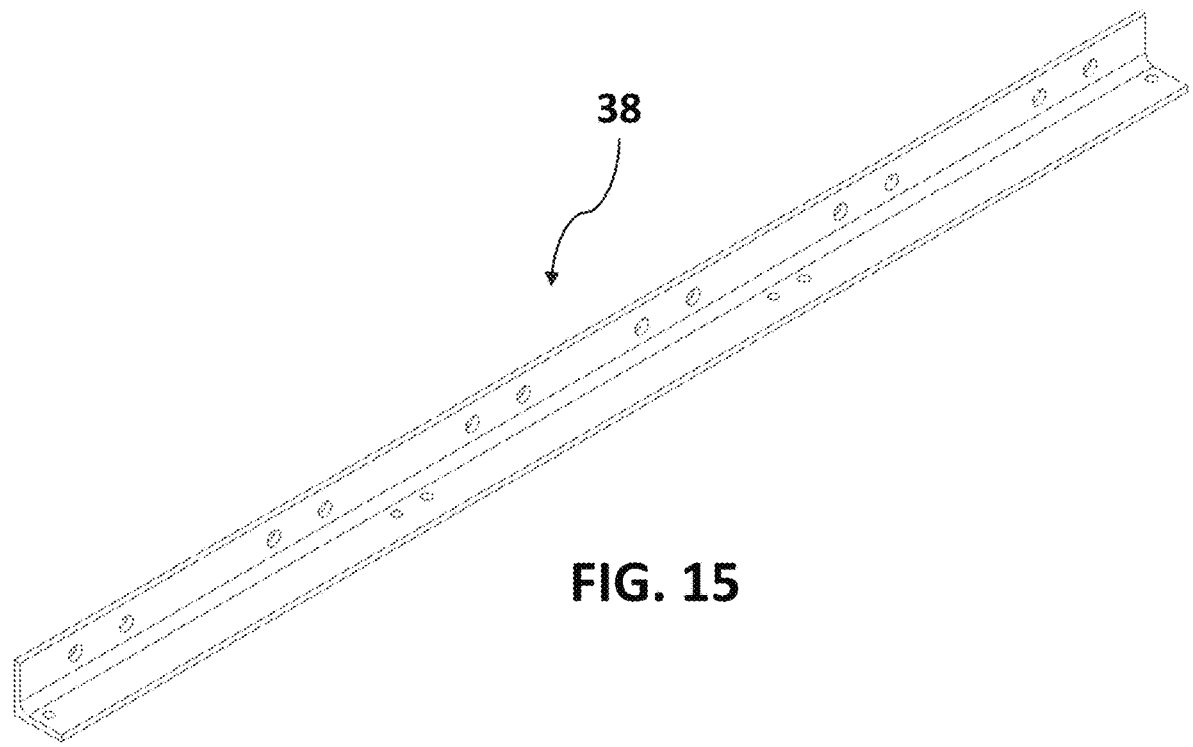
FIG. 15 is a side perspective view of a mounting angle of the linearized cone valve of FIG. 2.
Figure 16:
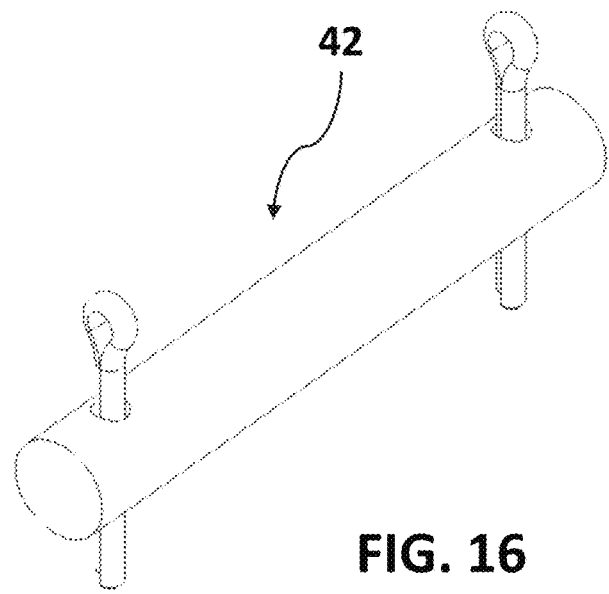
FIG. 16 is a side perspective view of a pivot pin with cotter pins inserted therein of the linearized cone valve of FIG. 2.
Figure 17:
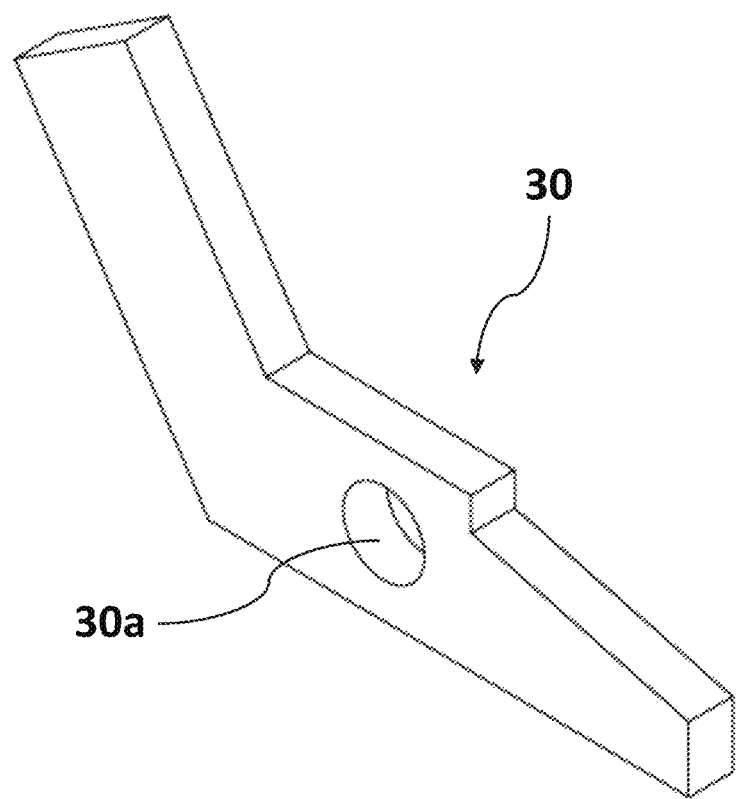
FIG. 17 is a side perspective view of a clevis plate of FIG. 2.
Figure 18:
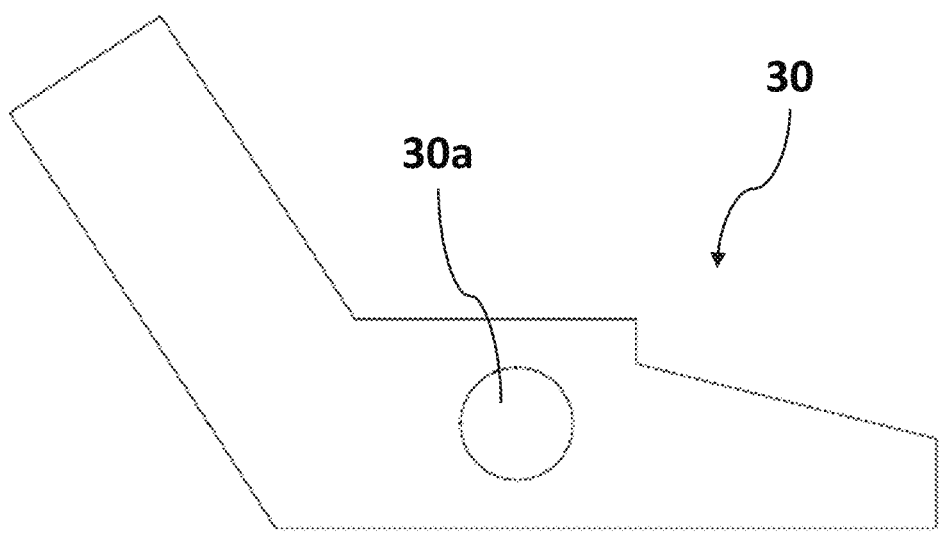
FIG. 18 is a side view of the clevis plate of FIG. 17.
Figure 19:
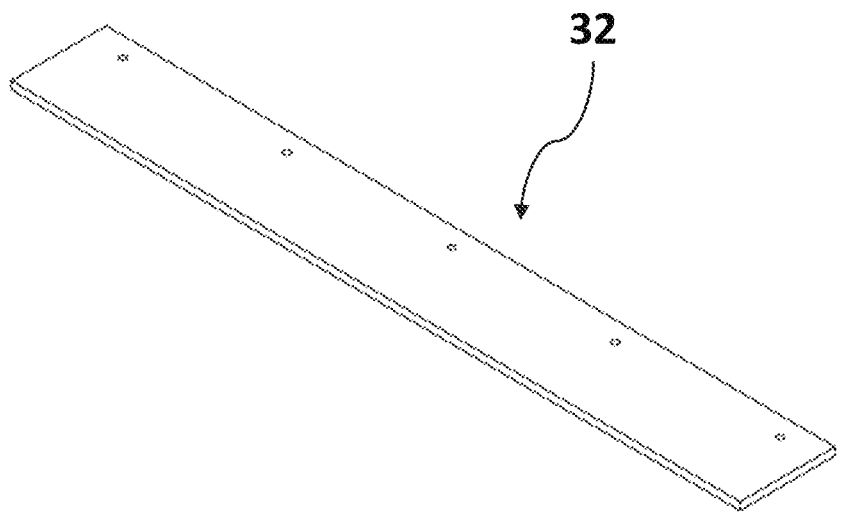
FIG. 19 is a side perspective view of a plate of the linearized cone valve of FIG. 2.
Figure 20:
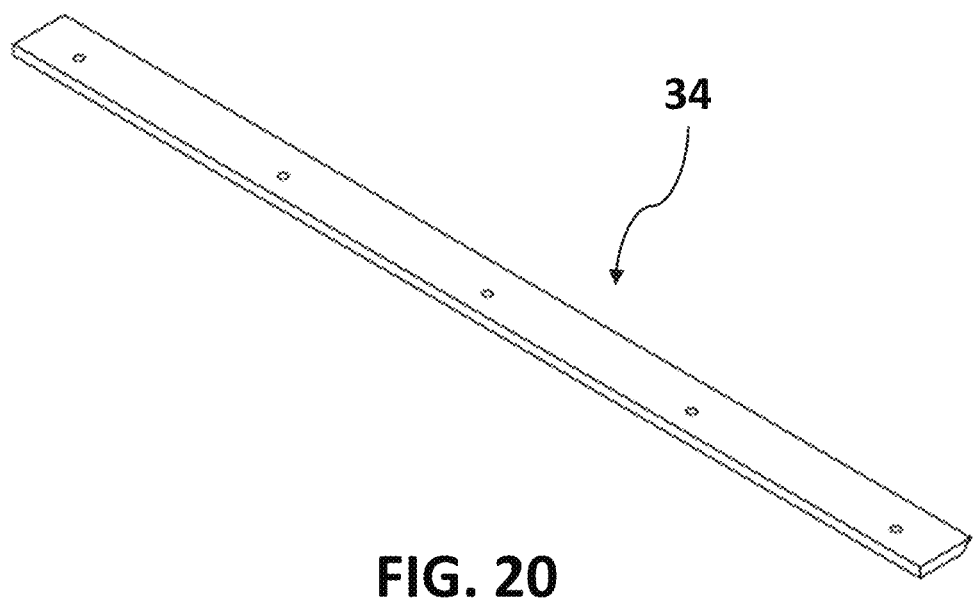
FIG. 20 is a side view of a bumper of the linearized cone valve of FIG. 2.

As shown for example in FIG. 10, clevis plates 30 pivot with respect to pins 42 which extend in holes 30a therein and which together define a common axis 42a for pivoting. Components of valves 20 thus are configured and dimensioned such that pivoting of clevis plates 30 about common axis 42a is limited by a free edge or end of mounting angle 38 which serves as a stop $S_1$. In other words, when a clevis plate 30 directly abuts mounting angle 38, further pivoting of end portion 30a of clevis plate 30 toward mounting angle 38 is prevented. As pivoting increases when gate 10 is raised, the angle $\alpha_1$ between deflection plate 32 and beam 22 (embedded in a concrete spillway) also increases.

Thus, in order to limit the opening of a valve 20, the mounting assembly (e.g., the mounting angle) may serve as a stop to limit the rotation of the deflection assembly. Alternatively, preexisting structural components of a gate itself may be used to limit rotation of the deflection assembly (e.g., the clevis plates 30 as coupled to plates 32 and pivoting about the axis defined by pins 42).

Figure 23:
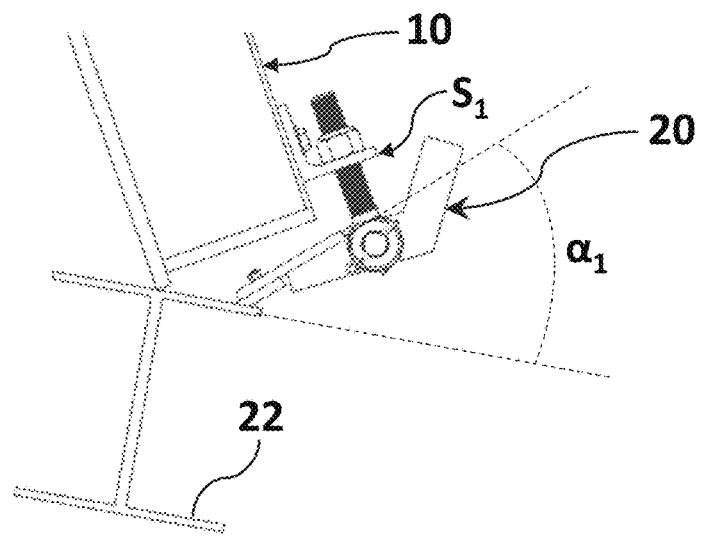
FIG. 23 is a partial side view of a tainter gate with a linearized cone valve of FIG. 2, with a free edge of the tainter gate abutting a steel sill beam embedded in a concrete spillway (not shown)
Figure 24:
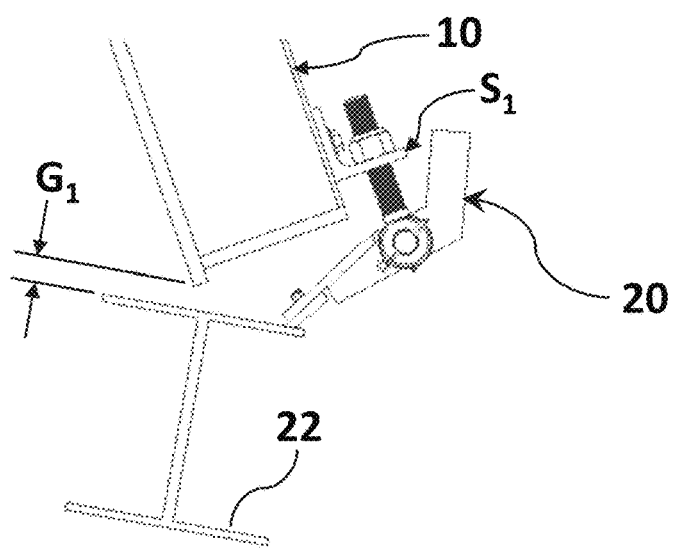
FIG. 24 is a partial side view of a tainter gate with a linearized cone valve of FIG. 2, with a free edge of the tainter gate raised one inch off of a steel sill beam embedded in a concrete spillway (not shown)
Figure 25:
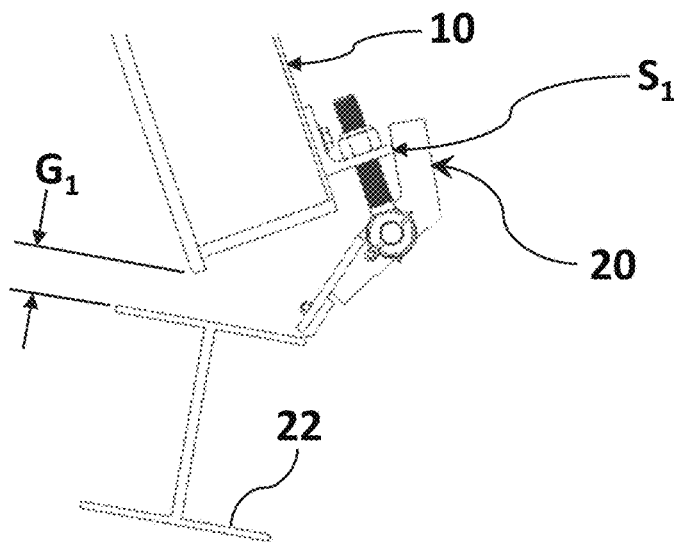
FIG. 25 is a partial side view of a tainter gate with a linearized cone valve of FIG. 2, with a free edge of the tainter gate raised two inches off of a steel sill beam embedded in a concrete spillway (not shown)

In operation, with valve 20 coupled to tainter gate 10, clevis plates 30 along with plate 32 and bumper 34 pivot as tainter gate 10 is raised or lowered. For example, in a preferred exemplary embodiment, tainter gate 10 may be raised by as much as 2 inches from its resting point on beam 22 so as to actuate valve 20 through its range of motion (although in other embodiments, gate 10 may be raised more than that amount). The ability to raise or lower gate 10 is not impeded when valve 20 is actuated. As shown for example in FIG. 23, a free end or lower edge of tainter gate 10 abuts steel sill beam 22 (embedded in a concrete spillway, not shown) when gate 10 is in the fully closed position and no water flows from the impoundment. Once raised, water from the impoundment flows through valve 20 and, by flowing under gate 10 and impinging on valve 20, the water is sprayed into the atmosphere beyond downstream surface 18 and becomes oxygenated due to the large surface area of water droplets exposed to the atmosphere. Thus, as shown in FIG. 24, tainter gate 10 may be raised away from beam 22 creating a gap $G_1$ of one inch therebetween, thus permitting water from the impoundment to flow along deflector plates 32 and exit (downstream of the impoundment and gate 10) through the open regions between plates 32 and mounting angles 38. As shown in FIG. 25, tainter gate 10 may be further raised away from beam 22 creating a gap $G_1$ of two inches therebetween, thus permitting a greater volume of water from the impoundment to flow along deflector plates 32 and exit (downstream of the impoundment and gate 10) through the open regions between plates 32 and mounting angles 38. As shown in FIGS. 23-25, bumper 34 abuts beam 22 at all times for the desired range of pivoting corresponding to the desired range of gap $G_1$, thus restricting flow of water from the impoundment below plate 32 and bumper 34. Components of valve 20 obstructing the flow of water, such as clevis plates 30 and rod ends 40, advantageously assist in breaking up the flow and creating a spray of water droplets discharged downstream of the impoundment and gate. In an exemplary embodiment, when the water is sprayed through valves 20, the water droplets that are formed have a generally spherical shape and at least 75% of the water droplets have a diameter no greater than 1 cm. In another exemplary embodiment, when the water is sprayed through valves 20, the water droplets that are formed have a generally spherical shape and at least 50% of the water droplets have a diameter no greater than 1 mm. In yet another exemplary embodiment, when the water is sprayed through valves 20, the water droplets that are formed have a generally spherical shape and at least 25% of the water droplets have a diameter no greater than 0.1 mm.

Unexpectedly and advantageously, in some embodiments valves 20 maintain a constant gap for water discharge through valves 20 regardless of whether tainter gate 10 is raised, for example, over the range of one and one-tenth (1.1) inches or two (2) inches, thereby providing a constant water flow. In other words, the water flow through valves 20 is self-regulating over a particular range of distances by which gate 10 is raised from beam 22. Fixed volumes of water thus may be discharged through valves 20, within such range, without knowledge of the precise gap between tainter gate 10 and beam 22 when gate 10 is raised. Thus, for example, if it is desired to discharge 220 cubic feet per second (cfs) of water from the impoundment, gate 10 can be raised by one and one-tenth (1.1) inches, or alternatively one and three-quarters (1.75) inches, because valve 20 always will be open by a fixed amount (and thus provide constant water flow therethrough) for example within the range of gaps G covering one and one-tenth (1.1) inches or one and three-quarters (1.75) inches. In a preferred exemplary embodiment, valves 20 are self-regulating when a gate 10 is raised from its resting point between one and one-tenth (1.1) inches and two (2) inches. When gate 10 is raised by more than two (2) inches, valves 20 no longer contact beam 22 and some portion of the water flow from the impoundment passes unimpeded beneath, and without regulation by valves 20.

Typically, a gate 10 is opened more than two inches only for its standard purpose, i.e., to act as a spillway if an impoundment's level becomes too high (i.e., to protect the dam from being destroyed by too much hydrostatic pressure from water levels that are too high). Normally, it is not desirable to otherwise permit water from the impoundment to pass beyond the dam because it is inefficient from a power generation perspective (because the water would not pass through the turbine). However, water from the impoundment may be released to meet minimum flow requirements so that, for example, a river doesn't run dry upstream of the hydroelectric plant's power house. In addition, water might be released for the purpose of planned intervals of irrigation for farms.

The amount of aeration may be controlled as a function of the number of tainter gates that are provided with valves 20 and that are raised to release water from the impoundment. In other words, the amount of flow to be aerated varies (and is controlled) as a function of (1) the number of gates possessing valves 20 that are raised to release water, (2) the raising of the gate, and (3) the range of the gap $G_1$ in which valves 20 provide regulated flow.

In one embodiment, a tainter gate 10 with valves 20 is located proximate an end tainter gate of a spillway section. For example, Tuckertown Dam located in Nash County, N.C. and opened in 1962, comprises a 1,370-foot-long, 76-foot-high dam with (1) a 45-foot-long rock filled section, (2) a 178-foot-long non-overflow section, (3) a 481-foot-long gated spillway section with eleven 35-foot-wide by 38-foot-high tainter gates, (4) a middle 20-foot-long non-overflow section, (5) a 204-foot-long powerhouse intake, (6) a 100-foot-long non-overflow section, and (7) a 342-foot-long rock fill section. In addition, a 204-foot-long, 115-foot-high powerhouse is integral with the dam and has three Kaplan turbine units directly connected to generators, with each unit having a licensed capacity of 12.68 MW for a total licensed capacity of 38.04 MW. In an exemplary embodiment, the tainter gate closest to the powerhouse is provided with valves 20 and is raised for purposes of aerating water discharged from the impoundment.

Figure 9:
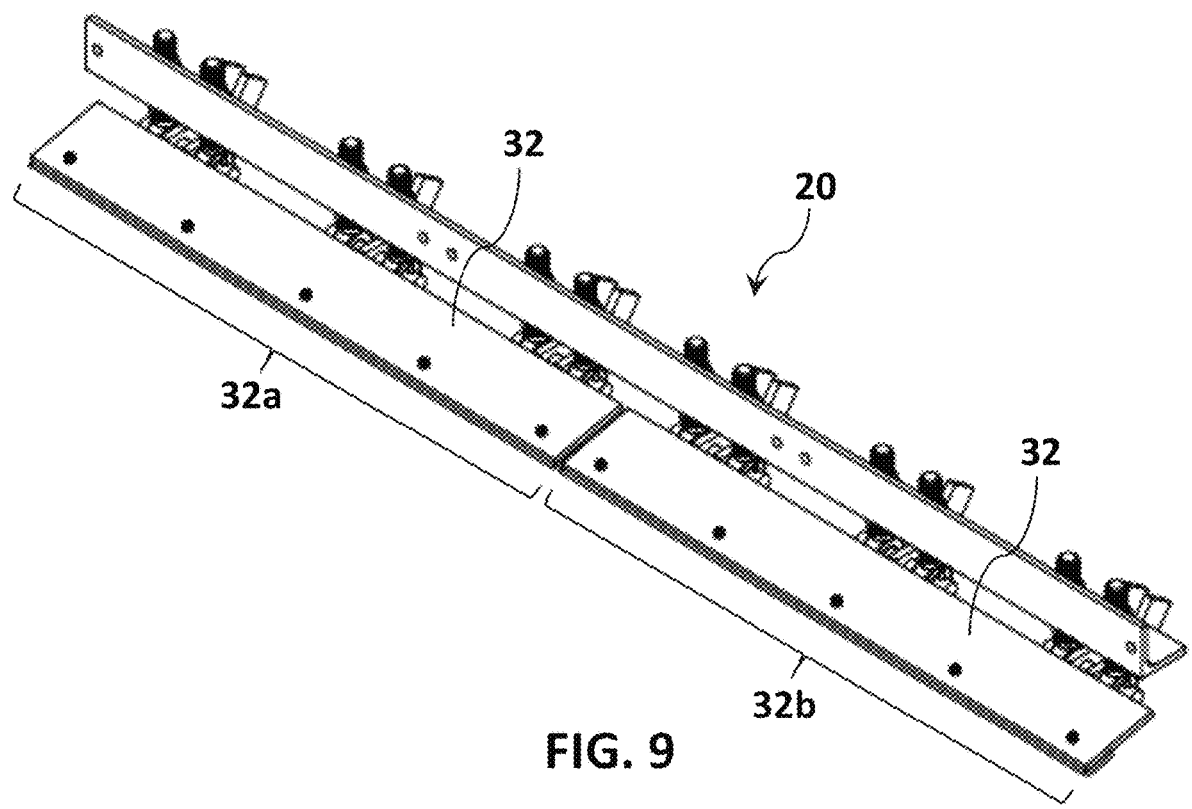
FIG. 9 is a rear perspective view of the linearized cone valve of FIG. 2.

For example, for a single 35-foot wide tainter gate at Tuckertown Dam, a total of seven sections of valves 20 are coupled to the gate, five of which are each approximately 6 feet in width and together are disposed between (bookended by) two valves each of which is approximately 2.5 feet in width (as compared to the six sections of valves 20a-20f shown in FIG. 6, all of which have the same width). A single, six-foot wide section of valve 20 is on the order of 100 lbs. in weight. In essence, by sizing valves 20 to each be 6 feet in width, or 2.5 feet in width, valves 20 are designed for modular installation. Advantageously, valves of these sizes can be installed by hand rather than requiring a crane (which is difficult to use and position safely at a dam). Another advantage of using multiple valves 20 is that collectively, valves 20 more readily adapt to the surface on which they rest (e.g., steel beam(s) or concrete). Each valve 20 abuts a portion of that surface, which may be irregular across its length. If only a single valve 20 were to be sized, for example, to span the entire length of a gate, surface irregularities could not be accommodated and differences in gap size between the valve and the surface could occur over the span. Moreover, such valves are more readily manipulated by workers during the installation process because they are reasonably lightweight compared to a single valve spanning the entire width of a gate. In addition, components of valves 20 are installed piecemeal, such that mounting angle or channel 38 is first either bolted or welded to the gate, and then a deflector plate 32 subsequently is installed. To facilitate installation, components may be provided in two or more sections; for example, deflector plate 32 may be provided in sections 32a, 32b as shown in FIG. 9.

Each tainter gate 10 has its own spillway. A tainter gate 10 typically is disposed between two spillway walls. Proximate the two spillway walls on either side of gate 10, a lower face of gate 10 may include protruding structural reinforcements or other appurtenances. In order to accommodate those irregularities in the bottom surface of the gate, shorter valves may be provided which include a first section that is configured like a standard valve and a second section that straddles the reinforcements using extended, cantilevered deflection assemblies to aerate water where the valve cannot be easily attached. Such accommodations are shown with respect to Stoney gates as will be described shortly. In one embodiment, five clevis plates 30 may be welded to a single deflector plate 32 with a single bumper 34 mounted thereto (as shown for example in FIGS. 11-13). For example, clevis plates may be provided in pairs and separated by approximately 1.0 inch in order to limit motion of the deflection assembly along the axis defined by pivot pins 42.

Figure 26:
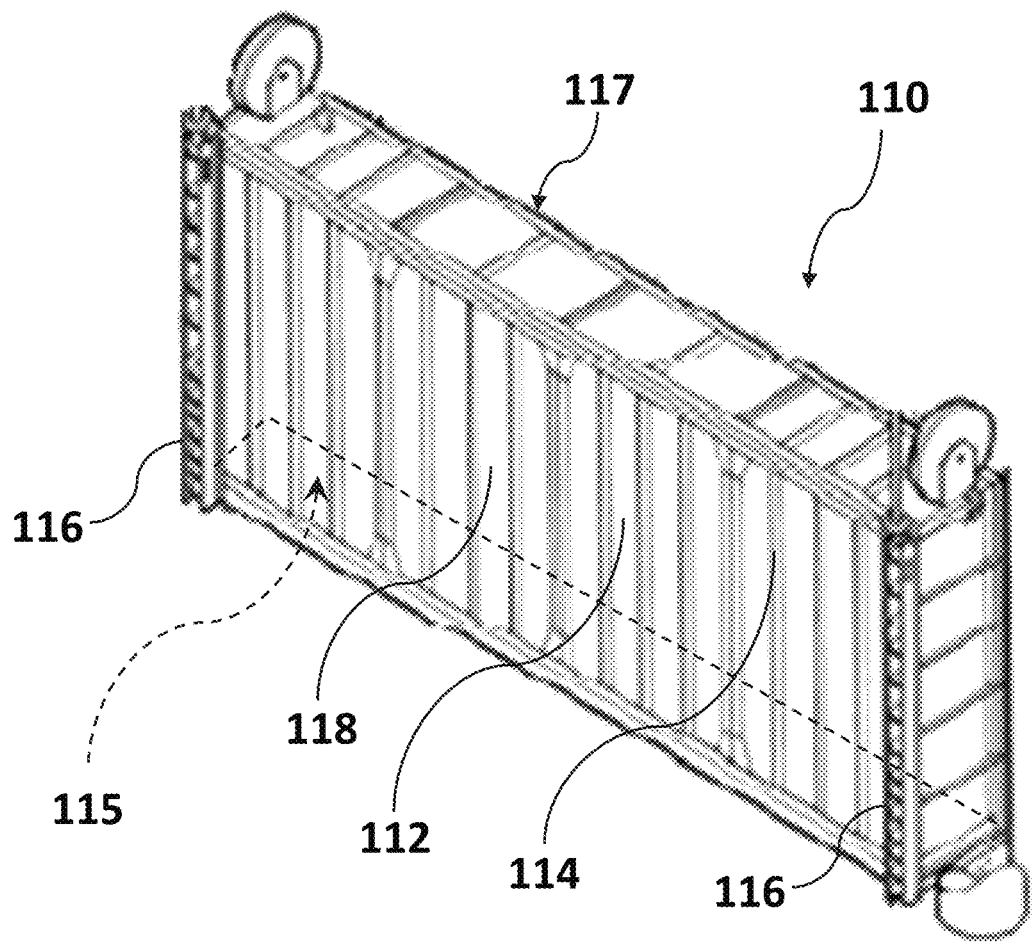
FIG. 26 is a partial side perspective view of a Stoney gate of the prior art, reproduced and adapted from Agathe Lesage, Wilson Dam & Hydroelectric Plant, Stoney Spillway Gate—1925, Wilson Dam Road (Rt. 133), Spanning the Tennessee River, Muscle Shoals, Colbert County, Ala., Tennessee Valley Authority Recording Project, Historical American Engineering Record, National Park Service (1994)

Turning to FIG. 26, an exemplary Stoney gate 110, for example, comprises a structural steel body 112 with a plurality of ribs 114 and a bottom plate 115 that rests on a concrete spillway (or alternatively a steel beam embedded in the spillway) when the gate is fully closed. Gate 110 bears on a train of rollers 116 in each gate guide. In particular, the gate bears upon a first set of rollers disposed between two sets of fixed tracks, with one of the sets of tracks mounted on the gate and the other mounted on the piers of the dam. Because the rollers are not affixed to either of the sets of tracks, the rollers and gates move independently. When the gate moves upward, the rollers move upward by only half as much. Only the bearing section of the gate is in contact with the rollers when the gate moves. Gate 110 has an upstream surface or side 117 and a downstream surface or side 118 on which ribs 114 may be disposed. Like tainter gates, Stoney gates are known to be safe by virtue of their weight in steel and ready lifting or lowering.

As shown in FIGS. 27-32, in another embodiment, a linearized cone or aeration valve 120 comprises clevis plates 130, deflection plates 132, bumpers 134, cotter pins 136 (e.g., each ¼" diameter and 2" long) extending through parallel through-holes in pins 142, and a mounting assembly 137 comprising mounting angle or channel 138, fully threaded rod ends 140 (e.g., rod end bolts each with a 2.75" shank length and 1"-8 thread), rod-end nuts 144 (e.g., nylon-insert locknuts for 1"-8 thread) as well as washers 145 for coupling to rod ends 140, and mounting angle or channel 138 may be welded directly to bottom plate 115 of gate 110. Valve 120 further comprises bumper screws 146 (e.g., hex drive flat head screws with ¼"-20 thread and 1⅛" length), and bumper nuts 148 (e.g., nylon-insert locknuts for ¼"-20 thread). Each of the aforementioned components preferably is formed of stainless steel, except bumper 134 which preferably is made of ultra-high molecular weight (UHMW) polyethylene. In a preferred exemplary embodiment, mounting angle or channel 138 is made of low-carbon steel, while rod ends 140, clevis plates 130, deflection plate 132, and pins 142 are formed of 304 stainless steel. Cotter pins 136 are formed of 316 stainless steel, while rod end nuts 144, bumper screws 146, and bumper nuts 148 are formed of 18-8 stainless steel.

Figure 27:
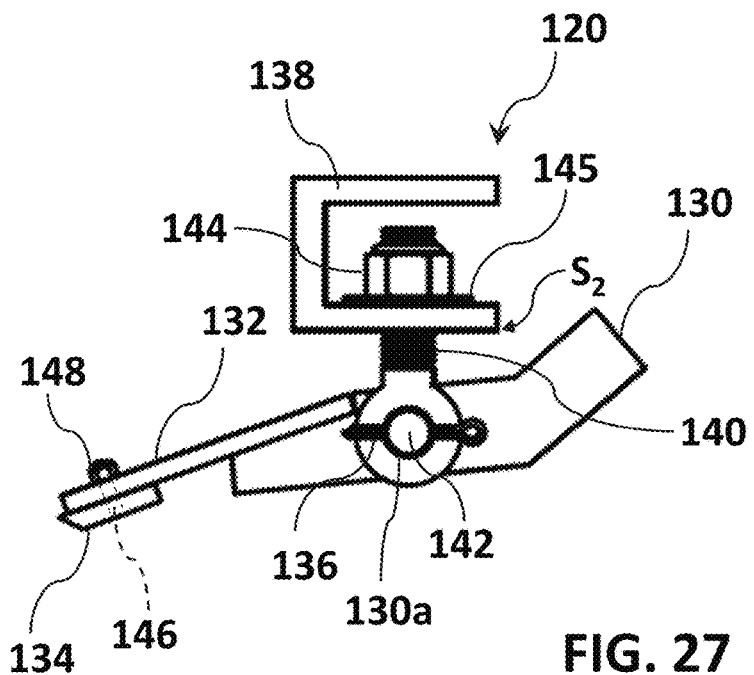
FIG. 27 is a side view of another embodiment of a linearized cone valve.
Figure 28:
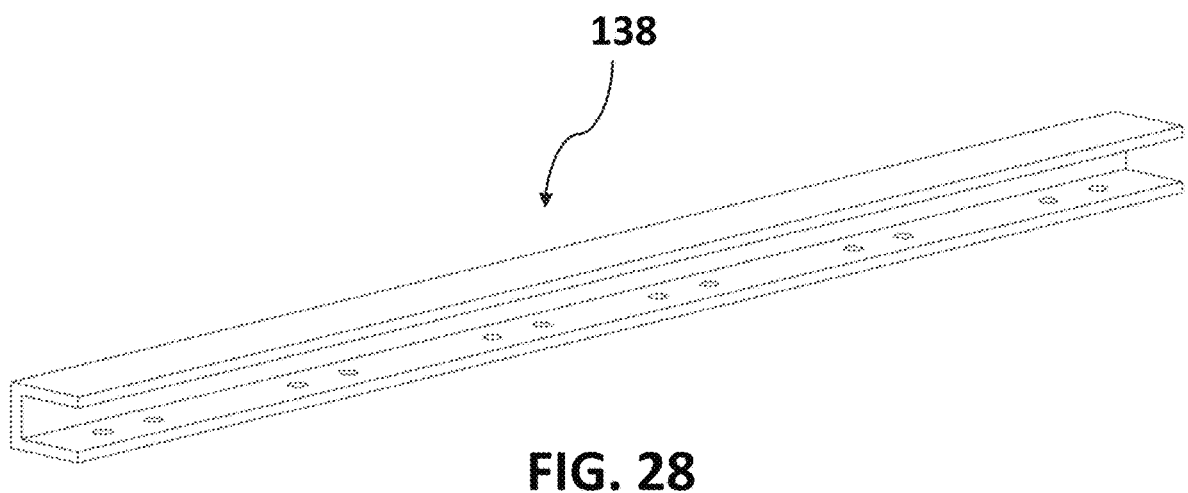
FIG. 28 is a side perspective view of a channel of the linearized cone valve of FIG. 27.
Figure 29:
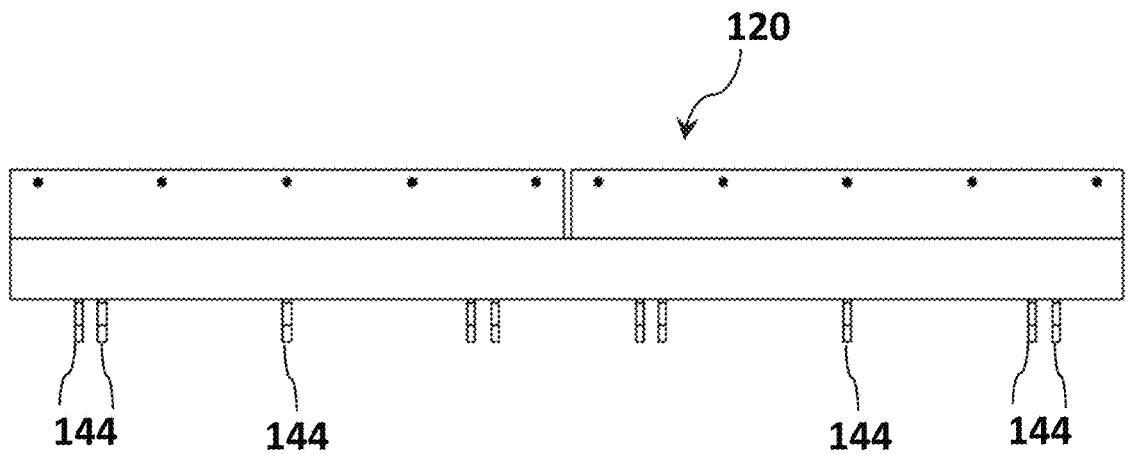
FIG. 29 is a partial top view of the linearized cone valve of FIG. 27.
Figure 30:
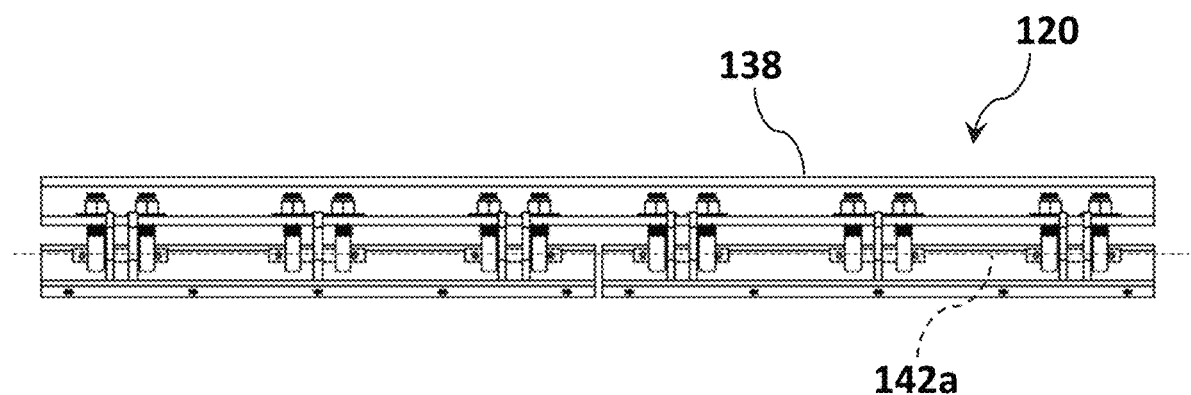
FIG. 30 is a front view of the linearized cone valve of FIG. 27.
Figure 31:
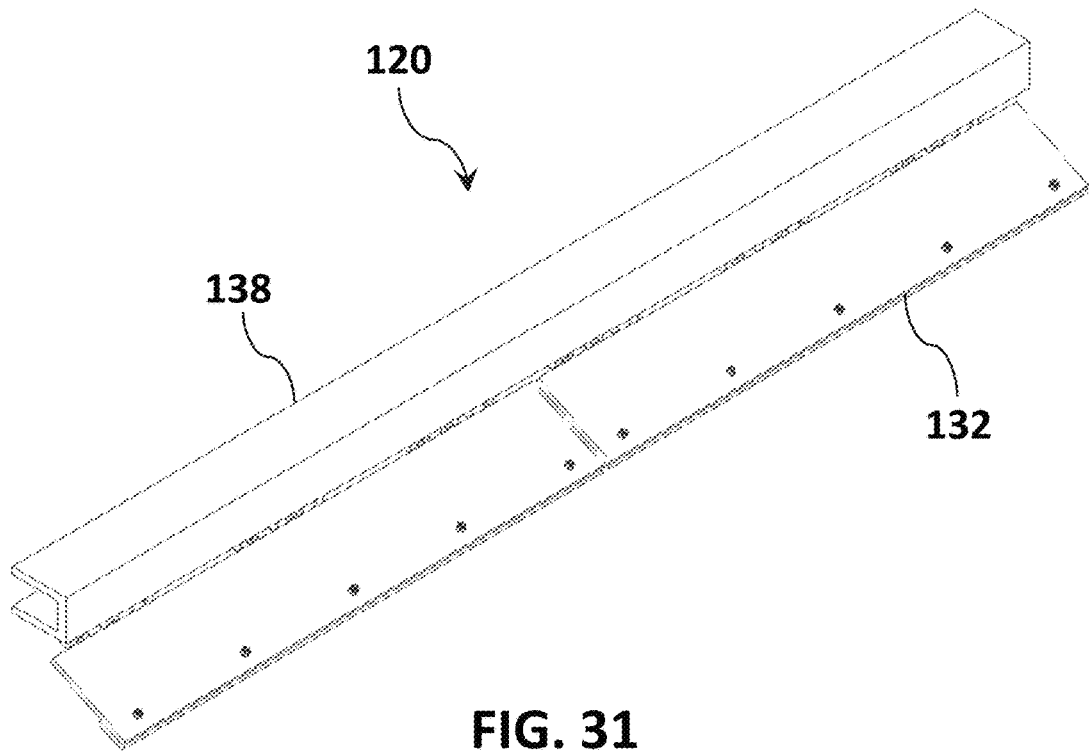
FIG. 31 is a rear perspective view of the linearized cone valve of FIG. 27.

As shown for example in FIG. 27, clevis plates 130 pivot with respect to pins 142 which extend in holes 130a therein and which together define a common axis for pivoting. Components of valves 120 thus are configured and dimensioned such that pivoting of clevis plates 130 about the common axis 142a is limited by a free edge or end of mounting channel 138 which serves as a stop $S_2$. In other words, when a clevis plate 130 directly abuts mounting angle 138, further pivoting is prevented. As pivoting increases when gate 110 is raised, the angle $\alpha_2$ between deflector plate 132 and spillway 122 also increases.

Thus, in order to limit the opening of a valve 120, the mounting assembly (e.g., the mounting channel) may serve as a stop to limit the rotation of the deflection assembly. Alternatively, preexisting structural components of a gate itself may be used to limit rotation of the deflection assembly (e.g., the clevis plates 130 as coupled to plates 132 and pivoting about the axis 142a defined by pins 142).

Figure 36:
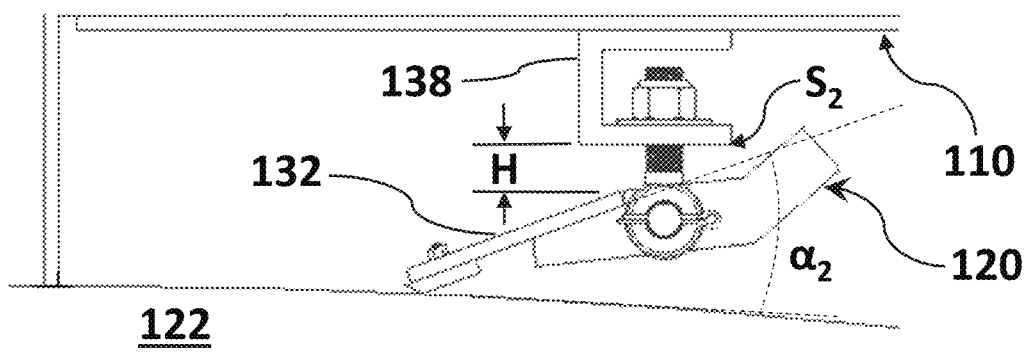
FIG. 36 is a side view of a Stoney gate with a linearized cone valve of FIG. 27, with a free edge of the Stoney gate abutting a concrete spillway.
Figure 37:
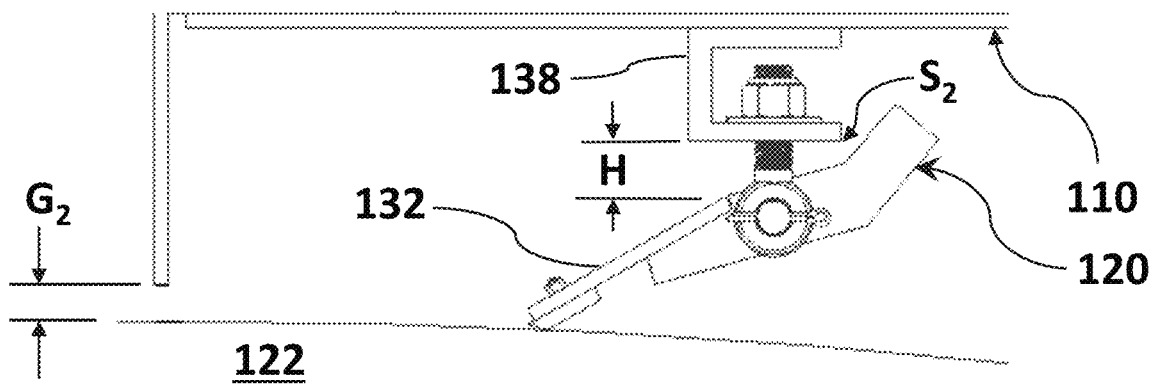
FIG. 37 is a side view of a Stoney gate with a linearized cone valve of FIG. 27, with a free edge of the Stoney gate raised one inch off of a concrete spillway.
Figure 38:
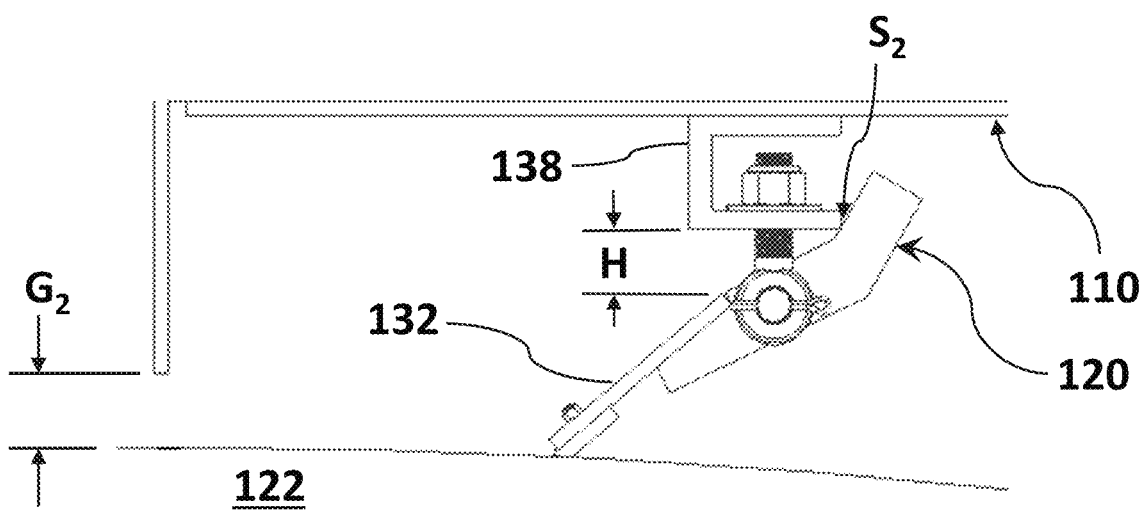
FIG. 38 is a side view of a Stoney gate with a linearized cone valve of FIG. 27, with a free edge of the Stoney gate raised two inches off of a concrete spillway.

In operation, with valve 120 coupled to Stoney gate 110, clevis plates 130 along with plate 132 and bumper 134 pivot as Stoney gate 110 is raised or lowered. For example, in a preferred exemplary embodiment, Stoney gate 110 may be raised between zero (0) and two (2) inches from its resting point on concrete spillway 122. As shown for example in FIG. 36, a free end or lower edge of Stoney gate 110 abuts concrete spillway 122 when gate 110 is in the fully closed position and no water flows from the impoundment. Once raised, water from the impoundment flows through valve 120 and, by flowing under gate 110 and impinging on valve 120, the water is sprayed into the atmosphere beyond downstream surface 118 and becomes oxygenated due to the large surface area of water droplets. Thus, as shown in FIG. 37, Stoney gate 110 may be raised away from concrete spillway 122 creating a gap $G_2$ of one inch therebetween, thus permitting water from the impoundment to flow along deflection plates 132 and exit (downstream of the impoundment and gate 110) through the open regions between plates 132 and mounting angles or channels 138. As shown in FIG. 38, Stoney gate 110 may be further raised away from concrete spillway 122 creating a gap $G_2$ of two inches therebetween, thus permitting a greater volume of water from the impoundment to flow along deflection plates 132 and exit (downstream of the impoundment and gate 110) through the open regions between plates 132 and mounting angles 138. The creation of such a gap $G_2$ through which water flows is further shown in FIG. 35. As shown particularly in FIGS. 36-38, bumper 134 abuts concrete spillway 122 at all times for the desired range of pivoting of valve 120 corresponding to the desired range of gap $G_2$, thus restricting flow of water from the impoundment below plate 132 and bumper 134. Components of valve 120 obstructing the flow of water, such as clevis plates 130 and rod ends 140, advantageously assist in breaking up the flow and creating a spray of water droplets discharged downstream of the impoundment and gate. In an exemplary embodiment, when the water is sprayed through valves 120, the water droplets that are formed have a generally spherical shape and at least 75% of the water droplets have a diameter no greater than 1 cm. In another exemplary embodiment, when the water is sprayed through valves 120, the water droplets that are formed have a generally spherical shape and at least 50% of the water droplets have a diameter no greater than 1 mm. In yet another exemplary embodiment, when the water is sprayed through valves 120, the water droplets that are formed have a generally spherical shape and at least 25% of the water droplets have a diameter no greater than 0.1 mm.

In an exemplary embodiment, a gap H is disposed between a bottom surface of channel 138 and a free end of deflection plate 132 of valve 120 proximate pin 142. If $G_2<H$, then $G_2$ dictates the flow of water through valve 120. If $K>G_2>H$, where K is a preset maximum size for example two (2) inches and H for example is one and a half (1.5) inches, then H dictates the flow of water through valve 120. And if $G_2>K$, then valve 120 no longer contacts the bottom of the spillway.

In an exemplary embodiment, if $G_2=H$, and $G_2<K$, then the rate of flow through valve 120 remains substantially constant.

In an exemplary embodiment, when $G_2$ is zero (0) inch to two (2) inches, the gap H is substantially constant over that range.

Figure 32:
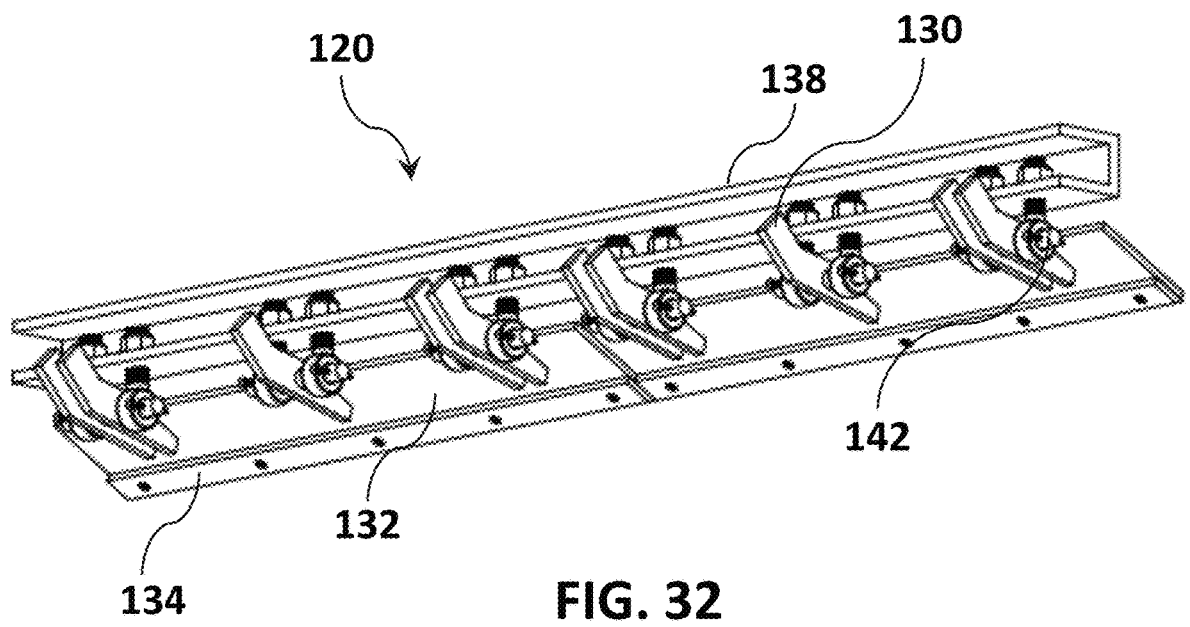
FIG. 32 is another front perspective view of the linearized cone valve of FIG. 27.
Figure 35:
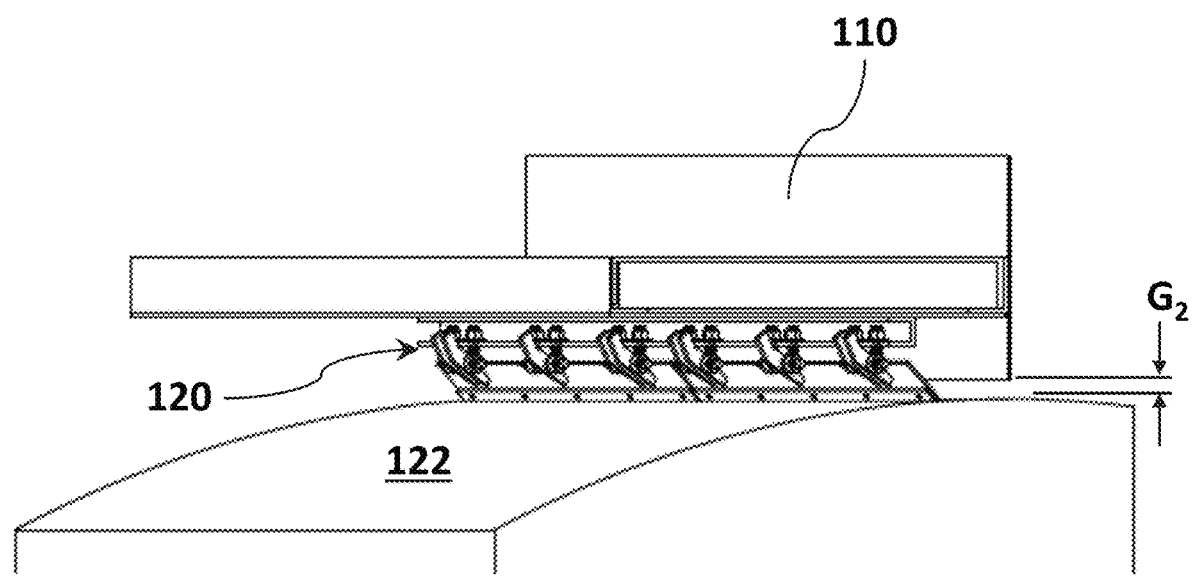
FIG. 35 is a partial front view (e.g., from a perspective from downstream of an impoundment looking upstream) of a Stoney gate with the linearized cone valve of FIG. 27, with a free edge of the Stoney gate raised with respect to a concrete spillway.

As shown for example in FIGS. 32 and 35, valves 120 may be provided proximate the base of Stoney gate 110 in modular fashion. In particular, as shown in the exemplary embodiment, one valve 120 may comprise ten clevis plates 130 pivoting on pins 142 about common axis 142a. To save weight, provide additional modularity, and permit a design with break-away capabilities such that only a portion of valve 120 may be lost due to impact by an obstruction, multiple pins 142 are provided, preferably one pin for each single or pair of clevis plates 130. For ease of installation and maintenance, several deflection plates 132 may be provided for a valve 120, also for modularity of design, disposed adjacent and in the same plane as one another, as shown for example in FIGS. 29-32.

Figure 33:
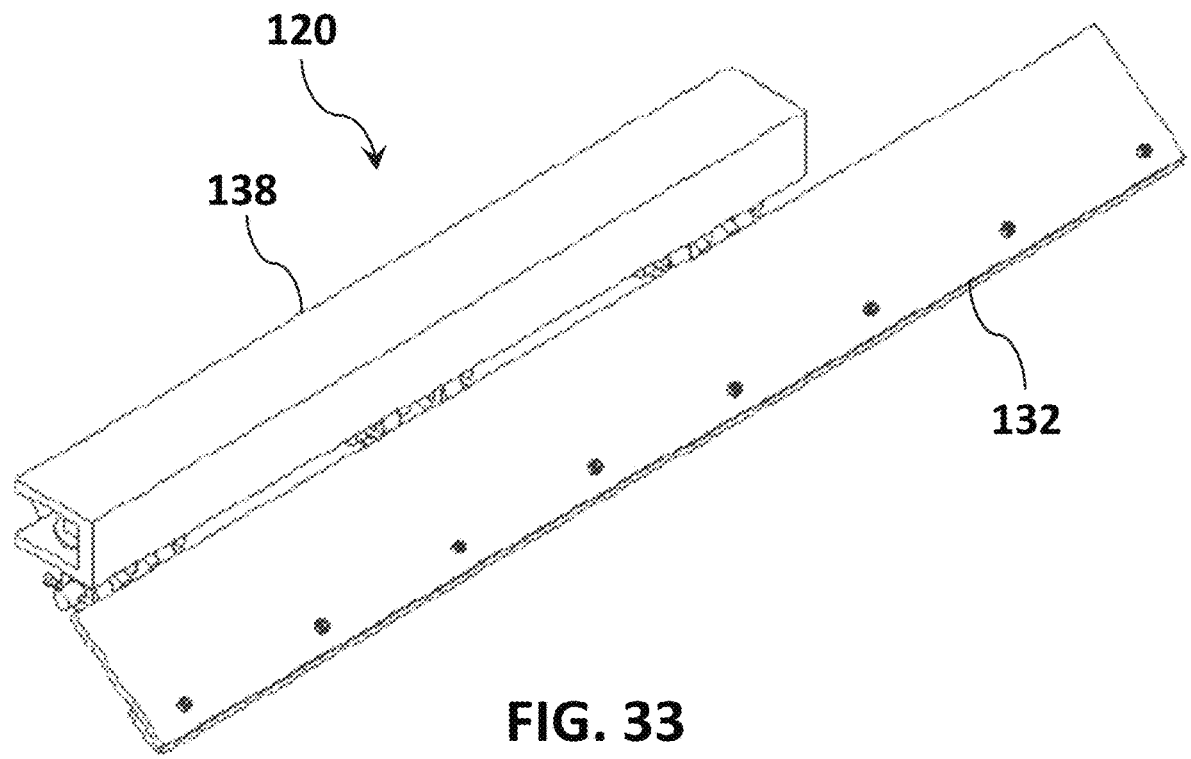
FIG. 33 is a rear perspective view of yet another embodiment of a linearized cone valve.
Figure 34:
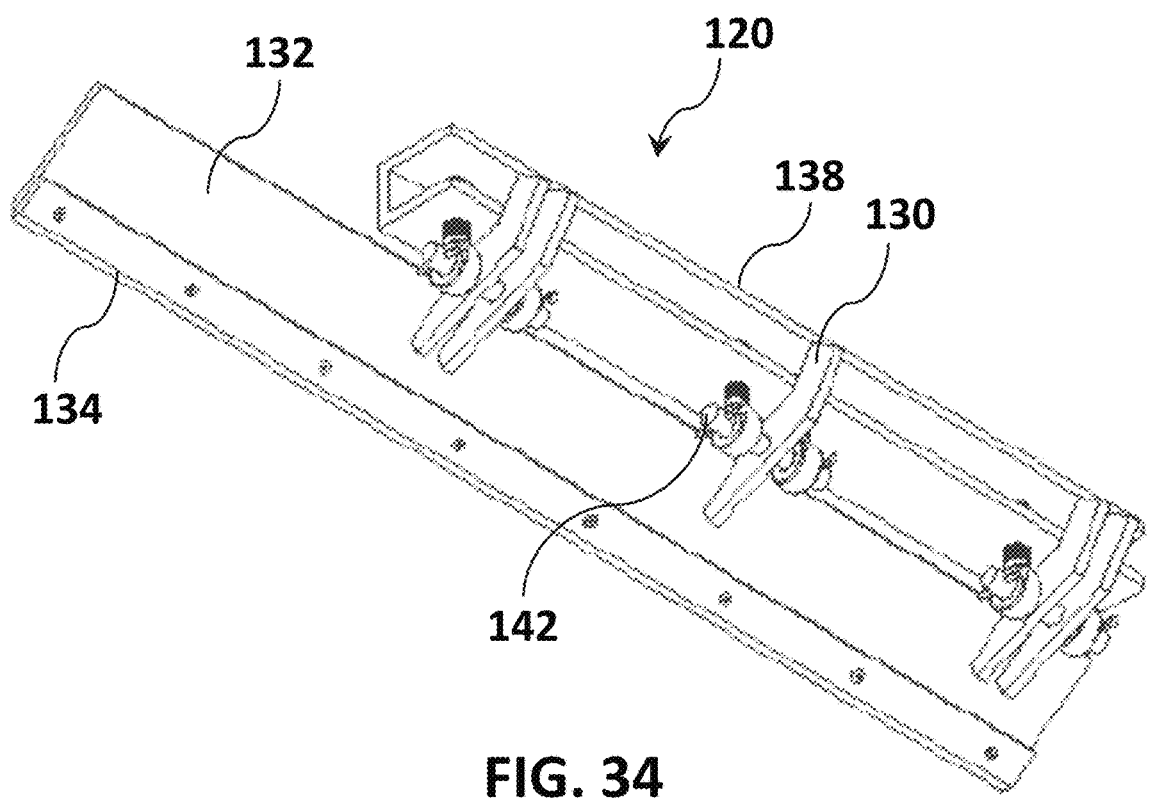
FIG. 34 is a front perspective view of the linearized cone valve of FIG. 33.

Turning to FIGS. 33-34, in some embodiments, channel 138 may have a length shorter than defection plate 132. Such a design permits installation, for example, in free end sections of a Stoney gate where clearance is needed for other structures or components of the gate (e.g., adjacent rollers 116).

For example, the High Rock Development is located in Davie, Davidson, and Rowan counties, North Carolina on the Yadkin River and opened in 1927. The reservoir is impounded by a 936-foot-long, 101-foot-high dam that comprises (1) a 58-foor long non-overflow section, (2) a 550-foot-long gated spillway section with ten 45-foot-wide by 30-foot-high stoney gates, (3) a 178-foot-long, 125-foot-high powerhouse intake, and (4) a 150-foot-long non-overflow section. The concrete powerhouse is integral with the dam and comprises three vertical Francis turbine/generator units with a total installed capacity of 32.91 MW. In an exemplary embodiment, the Stoney gate closest to the powerhouse is provided with valves 120 and is raised for purposes of aerating water discharged from the impoundment. As shown in the figure, valve 120 is raised by one to two inches so as to permit flow of aerating water proximate zone A.

For example, for a single 45-foot wide Stoney gate at High Rock, a total of eight valves 120 are coupled to the gate, six of which are each approximately 6 feet in width and two of which are each approximately 4.5 feet in width. A single, six-foot wide valve 120 is on the order of 100 lbs. in weight.

In one preferred exemplary embodiment, valves 20, 120 provide aeration with a surface area to volume ratio of the discharged water being greater than or equal to 0.33. Preferably, this ratio is determined using high speed photography or alternatively by the amount of dissolved oxygen increase.

In some embodiments, vortex generators may be added to one or more components of valves 20, 120 on which water impinges, such as plates 32, 132.

In some embodiments, surface roughening may be added to one or more components of valves 20, 120 on which water impinges, such as plates 32, 132.

While stops $S_1$, $S_2$ are provided, respectively, by angles or channels 38, 138 herein, in some embodiments stops limiting the pivoting of clevis plates 20, 120 may be provided by the gate itself rather than portions of valves 20, 120. In other words, clevis plates 20, 120 may be configured and dimensioned, and disposed on gates 10, 110, to abut portions of gates 10, 110 when a desired about of pivoting about pins 30, 130 has occurred.

Advantageously, the exemplary embodiments described herein provide a constant discharge that is adjustable as a function of the location of the pivot axis 42a, 142a of valves 20, 120. In other words, discharge is constant over a particular regulated range of gap between the gate and the spillway surface. In alternate embodiments, valves 20, 120 may be provided which do not have such a regulated range.

Also, advantageously, the exemplary embodiments described herein provide an air infiltration system and method with valves 20, 120 that open and close using the force of the water from the impoundment and the motion of the gate itself, rather than requiring hydraulic equipment for actuation.

Preferably, valves 20, 120 are configured and dimensioned to not only promote attachment to gates 10, 110, but also to facilitate ease of installation and maintenance as well as to promote safety during and after installation and maintenance.

Optionally, components of valves 20, 120 may be sized and/or formed of suitable material such that they "break away" in the event that an overload force occurs, such as by a branch, log, or other obstruction that inadvertently impacts and/or abuts valves 20, 120 when a gate 10, 110 is partially raised (e.g., when the valves, 20, 120 are in an open position). For example, pivot pins 42, 142 may be selected such that they shear off in such overload conditions, thus permitting the obstruction to flow with water from the impoundment past valves 20, 120 and downstream. With such a design, only the valves proximate the obstruction, e.g. at a portion of a single gate, are lost. In other words, a failure mode is purposefully provided so as to limit damage to valves at neighboring sections. Concomitantly, damage to one valve section does not adversely impact performance of other valve sections.

Preferably, linear aeration valves 20, 120 are sized to promote efficient and effective attachment to preexisting dam gate structures. For example, as shown in FIG. 1, a tainter gate 10 comprises ribs 14, and preferably valves 20 are bolted to ribs 14. Also, for example, as shown in FIG. 26, a Stoney gate 110 also comprises generally vertical ribs or straps 102, and preferably valves 120 are bolted to ribs 114. However, portions of valves 20, 120 alternatively may be welded to preexisting dam gate structures such as generally horizontal and or vertical strengthening ribs or straps 14, 102, or directly to the bottom plate 115 of the gate as shown for example in FIG. 26. Bolting, of course, advantageously facilitates repairs due to ease of removing components as compared to welding.

While various descriptions of the inventions are described above, it should be understood that the various features can be used singly or in any combination thereof. Therefore, the inventions are not to be limited to only the specifically preferred embodiments depicted or otherwise described herein.

Further, it should be understood that variations and modifications within the spirit and scope of the inventions may occur to those skilled in the art to which the inventions pertain. Accordingly, all expedient modifications readily attainable by one versed in the art from the disclosure set forth herein that are within the scope and spirit of the inventions are to be included as further embodiments of the inventions. The scope of the inventions is accordingly defined as set forth in the appended claims.

What is claimed is:

1. An air infiltration system for a hydroelectric plant comprising:
    a spillway gate; and
    a linearized cone valve coupled to the spillway gate, the linearized cone valve comprising a pivotable plate assembly disposed to partially obstruct flow and facilitate aeration when the spillway gate is in an open position.

2. The air infiltration system of claim 1, wherein the spillway gate is a tainter gate.

3. The air infiltration system of claim 1, wherein the spillway gate is a Stoney gate.

4. The air infiltration system of claim 1, wherein the pivotable plate assembly comprises a deflection plate.

5. The air infiltration system of claim 4, wherein the deflection plate extends substantially the length of the spillway gate proximate an end thereof disposed toward a bottom of a spillway.

6. The air infiltration system of claim 4, wherein the pivotable plate assembly maintains a substantially constant opening over a fixed gap range between the spillway gate and a spillway surface.

7. The air infiltration system of claim 4, wherein over a fixed range of pivoting, the linearized cone valve permits a substantially constant rate of flow therethrough.

8. The air infiltration system of claim 1, wherein the linearized cone valve comprises a plurality of sections, each section comprising at least one deflection plate coupled to at least one clevis plate, the at least one clevis plate being pivotable about a pin.

9. The air infiltration system of claim 8, wherein the pin is configured and dimensioned to break away upon application of a force of at least a pre-set magnitude.

10. An air infiltration system for a hydroelectric plant comprising:
    a spillway gate; and
    a linearized cone valve coupled to the spillway gate, the linearized cone valve comprising a pivotable plate assembly;
    wherein the linearized cone valve is bolted to at least one rib of the spillway gate.

11. The air infiltration system of claim 1, wherein the spillway gate comprises a bottom plate, and the linearized cone valve is welded to the bottom plate.

12. The air infiltration system of claim 11, wherein the linearized cone valve is welded to at least one rib of the spillway gate.

13. A method of infiltrating air in water released from an impoundment, the method comprising:
    lifting a spillway gate from a resting position proximate a bottom of a spillway; and
    pivoting a deflection plate coupled to the gate proximate the bottom of the spillway;
    wherein water flows through an opening disposed between the deflection plate and the gate and is sprayed into an atmosphere to be oxygenated.

14. The method of claim 13, wherein when the water is sprayed, water droplets are formed with a generally spherical shape and at least 75% of the water droplets have a diameter no greater than 1 cm.

15. The method of claim 13, wherein when the water is sprayed, water droplets are formed with a generally spherical shape and at least 50% of the water droplets have a diameter no greater than 1 mm.

16. The method of claim 13, wherein when the water is sprayed, water droplets are formed with a generally spherical shape and at least 25% of the water droplets have a diameter no greater than 0.1 mm.

17. The method of claim 13, wherein a ratio of total surface area of water droplets after being expelled from the opening to total surface area otherwise created by laminar flow entering the opening is at least 10.

18. The method of claim 13, wherein a ratio of total surface area of water droplets after being expelled from the opening to total surface area otherwise created by laminar flow entering the opening is at least 25.

19. The method of claim 13, wherein a ratio of total surface area of water droplets after being expelled from the opening to total surface area otherwise created by laminar flow entering the opening is at least 50.

20. The method of claim 13, wherein a ratio of total surface area of water droplets after being expelled from the opening to total surface area otherwise created by laminar flow entering the opening is at least 75.

21. The method of claim 13, wherein at least a 1000% increase in surface area of water exposed to the atmosphere is created when the water is sprayed.

22. The method of claim 13, wherein at least a 2500% increase in surface area of water exposed to the atmosphere is created when the water is sprayed.

23. The method of claim 13, wherein at least a 5000% increase in surface area of water exposed to the atmosphere is created when the water is sprayed.

24. The method of claim 13, wherein at least a 7500% increase in surface area of water exposed to the atmosphere is created when the water is sprayed.

25. The method of claim 13, wherein a ratio of (a) surface energy creation when water flows through the opening disposed between the deflection plate and the gate to (b) surface energy creation for laminar flow of water under the gate if the deflection plate is not present is at least 10.

26. The method of claim 13, wherein a ratio of (a) surface energy creation when water flows through the opening disposed between the deflection plate and the gate to (b) surface energy creation for laminar flow of water under the gate if the deflection plate is not present is at least 25.

27. The method of claim 13, wherein a ratio of (a) surface energy creation when water flows through the opening disposed between the deflection plate and the gate to (b) surface energy creation for laminar flow of water under the gate if the deflection plate is not present is at least 50.

28. The method of claim 13, wherein a ratio of (a) surface energy creation when water flows through the opening disposed between the deflection plate and the gate to (b) surface energy creation for laminar flow of water under the gate if the deflection plate is not present is at least 75.

29. The method of claim 13, wherein at least a 1000% increase in surface energy is created by water flowing (a) through the opening disposed between the deflection plate and the gate as compared to (b) laminar flow of water under the gate if the deflection plate is not present.

30. The method of claim 13, wherein at least a 2500% increase in surface energy is created by water flowing (a) through the opening disposed between the deflection plate and the gate as compared to (b) laminar flow of water under the gate if the deflection plate is not present.

31. The method of claim 13, wherein at least a 5000% increase in surface energy is created by water flowing (a) through the opening disposed between the deflection plate and the gate as compared to (b) laminar flow of water under the gate if the deflection plate is not present.

32. The method of claim 13, wherein at least a 7500% increase in surface energy is created by water flowing (a) through the opening disposed between the deflection plate and the gate as compared to (b) laminar flow of water under the gate if the deflection plate is not present.

33. The method of claim 13, wherein the deflection plate breaks away upon application of a force of at least a pre-set magnitude.

34. The method of claim 13, wherein a ratio of (1) surface area of water exposed to atmosphere after flowing through the opening disposed between the deflection plate and the gate to (2) volume of water entering the opening is at least 300.

35. The method of claim 13, wherein a ratio of (1) surface area of water exposed to atmosphere after flowing through the opening disposed between the deflection plate and the gate to (2) volume of water entering the opening is at least 3000.

36. The method of claim 13, wherein a ratio of (1) surface area of water exposed to atmosphere after flowing through the opening disposed between the deflection plate and the gate to (2) volume of water entering the opening is at least 30,000.

37. The method of claim 13, wherein over a fixed range of gap between the spillway gate and the bottom of the spillway, a constant amount of water flows through the opening disposed between the deflection plate and the gate.

38. The method of claim 37, wherein the fixed range is 1.1 inches to 2 inches.

39. The method of claim 37, wherein the fixed range is 1.5 inches to 2 inches.

40. The method of claim 37, wherein a difference between a maximum gap in the fixed range and a minimum gap in the fixed range is at least 0.01% of a height of the spillway gate.

41. The method of claim 37, wherein a difference between a maximum gap in the fixed range and a minimum gap in the fixed range is at least 0.1% of a height of the spillway gate.

42. The method of claim 37, wherein a difference between a maximum gap in the fixed range and a minimum gap in the fixed range is at least 1% of a height of the spillway gate.

43. The method of claim 37, wherein a difference between a maximum gap in the fixed range and a minimum gap in the fixed range is at least 10% of a height of the spillway gate.

44. The method of claim 37, wherein the fixed range comprises a minimum gap and a maximum gap, with the minimum gap being 0.1 inch and the maximum gap being at least 0.5 inches.

45. The method of claim 13, wherein over a fixed range of gap between the spillway gate and the bottom of the spillway, the deflection plate remains in contact with the bottom of the spillway.

46. The method of claim 45, wherein the fixed range is 0 inch to 2 inches.

47. The method of claim 45, wherein the fixed range comprises a minimum gap and a maximum gap, with the minimum gap being 0 inch and the maximum gap being at least 0.1 inch.

48. The method of claim 13, wherein if a gap between the spillway gate and the bottom of the spillway exceeds a fixed size, then at least 90% of water released from the impoundment flows between the deflection plate and the bottom of the spillway.

49. The method of claim 48, wherein the fixed size is no greater than 24 inches.

50. The method of claim 48, wherein the fixed size is no greater than 12 inches.

51. The method of claim 48, wherein the fixed size is no greater than 1 inch.

52. The method of claim 48, wherein at least 95% of water released from the impoundment flows between the deflection plate and the bottom of the spillway.

53. The method of claim 48, wherein at least 99% of water released from the impoundment flows between the deflection plate and the bottom of the spillway.

54. The method of claim 13, wherein when the water is sprayed, the water forms droplets and surfaces of the droplets gain increased oxygen content from the atmosphere.

55. The method of claim 13, wherein a confluence forms from the water sprayed into the atmosphere and less-oxygenated water downstream from the impoundment, the confluence having dissolved oxygen concentration of at least 6.0 mg/l.

56. The method of claim 13, wherein a confluence forms from the water sprayed into the atmosphere and less-oxygenated water downstream from the impoundment, the confluence having dissolved oxygen concentration with a daily average of at least 5.0 mg/l with a minimum instantaneous value of at least 4.0 mg/l.

57. The method of claim 13, wherein a confluence forms from the water sprayed into the atmosphere and less-oxygenated water downstream from the impoundment, the confluence increasing dissolved oxygen concentration in water downstream from the impoundment.

* * * * *